US012375332B2

United States Patent
Takeda et al.

(10) Patent No.: US 12,375,332 B2
(45) Date of Patent: *Jul. 29, 2025

(54) CONTROL CHANNEL DECODING CONFIGURATIONS FOR CROSS-CARRIER SCHEDULING

(71) Applicant: QUALCOMM INCORPORATED, San Diego, CA (US)

(72) Inventors: Kazuki Takeda, Tokyo (JP); Alberto Rico Alvarino, San Diego, CA (US); Peter Gaal, San Diego, CA (US); Wanshi Chen, San Diego, CA (US); Tao Luo, San Diego, CA (US); Jing Sun, San Diego, CA (US); Juan Montojo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,944

(22) Filed: Apr. 1, 2024

(65) Prior Publication Data

US 2024/0333570 A1     Oct. 3, 2024

Related U.S. Application Data

(63) Continuation of application No. 17/448,702, filed on Sep. 23, 2021, now Pat. No. 11,979,266.
(Continued)

(51) Int. Cl.
*H04L 27/26*     (2006.01)
*H04L 1/00*     (2006.01)
(Continued)

(52) U.S. Cl.
CPC ...... *H04L 27/26025* (2021.01); *H04L 1/0038* (2013.01); *H04W 24/08* (2013.01); *H04W 72/1263* (2013.01); *H04W 72/23* (2023.01)

(58) Field of Classification Search
CPC ............. H04L 27/26025; H04L 1/0038; H04L 5/0053; H04L 5/0064; H04L 5/0096;
(Continued)

(56) References Cited

U.S. PATENT DOCUMENTS

2013/0155868 A1\*   6/2013   Seo ................... H03M 13/3723
                                                                     370/241
2019/0191360 A1   6/2019   Sun et al.
(Continued)

FOREIGN PATENT DOCUMENTS

BR     112021002406 A2    5/2021
EP          3691381 A1    8/2020
(Continued)

OTHER PUBLICATIONS

International Preliminary Report On Patentability—PCT/US2021/052026—The International Bureau of WIPO—Geneva, Switzerland—Apr. 13, 2023.
(Continued)

*Primary Examiner* — Rownak Islam
(74) *Attorney, Agent, or Firm* — Harrity & Harrity, LLP

(57) ABSTRACT

Mechanisms for cross-carrier scheduling from a first cell to a second cell in a wireless networking scheme are provided. In one aspect, a method includes receiving, from a base station (BS), a first configuration for scheduling in a first cell having a first subcarrier spacing (SCS), wherein the first configuration is associated with a first search space in the first cell. The method further includes receiving, from the BS, a second configuration for scheduling in the first cell, wherein the second configuration is associated with a second
(Continued)

search space in a second cell, and wherein the second cell is associated with a different second SCS. The method further includes determining a number of blind detections (BDs) based on at least one of the first SCS or the second SCS, and monitoring, based on the number of BDs, for downlink control information (DCI) in the first and second search spaces.

30 Claims, 15 Drawing Sheets

Related U.S. Application Data

(60) Provisional application No. 63/086,515, filed on Oct. 1, 2020.

(51) Int. Cl.
*H04W 24/08* (2009.01)
*H04W 72/1263* (2023.01)
*H04W 72/23* (2023.01)

(58) Field of Classification Search
CPC ... H04L 27/2666; H04L 5/0032; H04L 5/001; H04L 5/0023; H04L 5/0048; H04W 24/08; H04W 72/1263; H04W 72/23

USPC .......................................................... 370/329
See application file for complete search history.

(56) References Cited

U.S. PATENT DOCUMENTS

| | | |
|---|---|---|
| 2019/0254025 A1 | 8/2019 | Lee et al. |
| 2019/0268207 A1 | 8/2019 | Al-Imari et al. |
| 2019/0356524 A1 | 11/2019 | Yi et al. |
| 2020/0244393 A1 | 7/2020 | Zhang et al. |
| 2022/0053522 A1 | 2/2022 | Molavianjazi et al. |
| 2022/0109597 A1 | 4/2022 | Takeda et al. |
| 2022/0201716 A1* | 6/2022 | Yi ..................... H04W 72/0453 |

FOREIGN PATENT DOCUMENTS

| | | |
|---|---|---|
| WO | 2019138510 A1 | 7/2019 |
| WO | 2020032693 A1 | 2/2020 |

OTHER PUBLICATIONS

International Search Report and Written Opinion—PCT/US2021/052026—ISA/EPO—Jan. 20, 2022.

* cited by examiner

CONTROL CHANNEL DECODING CONFIGURATIONS FOR CROSS-CARRIER SCHEDULING

CROSS-REFERENCE TO RELATED APPLICATIONS

The present application for patent is a Continuation of U.S. patent application Ser. No. 17/448,702 by Takeda et al., entitled "CONTROL CHANNEL DECODING CONFIGURATIONS FOR CROSS-CARRIER SCHEDULING" filed Sep. 23, 2021, which claims priority to and the benefit of U.S. Provisional Patent Application No. 63/086,515, filed Oct. 1, 2020, assigned to the assignee hereof, and which is expressly incorporated by reference herein.

TECHNICAL FIELD

This application relates to wireless communication systems, and more particularly to downlink control information (DCI) monitoring and decoding configurations for cross-carrier scheduling in a carrier aggregation system.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Carrier aggregation (CA) is a capability, for example, in LTE and 5G NR, in which two or more frequency bands or component carriers (CCs) can be combined to increase bandwidth. In some aspects, one CC may be used as an anchor carrier or a primary cell (Pcell) and another CC may be used as a supplemental carrier or a secondary cell (Scell). The Scell may include an uplink (UL) component carrier and a downlink (DL) component carrier. Alternatively, the Scell may include a DL component carrier only. In CA communication scenarios, cross-carrier scheduling may be used, whereby the UE monitors for downlink communication information (DCI) (e.g., downlink (DL) scheduling grants) on one cell (e.g., Pcell) and receives downlink data (e.g., in a physical downlink shared channel (PDSCH)) on another cell (e.g., Scell). Additionally or alternatively, the UE may monitor for the DCI (e.g., uplink (UL) scheduling grants) on one cell and transmit UL data (e.g., in a physical uplink shared channel (PUSCH)) on another cell.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

According to one aspect of the present disclosure, a method of wireless communication performed by a user equipment (UE) includes: receiving, from a base station (BS), a first configuration for scheduling in a first cell, wherein the first configuration is associated with a first search space in the first cell, and wherein the first cell is associated with a first subcarrier spacing (SCS); receiving, from the BS, a second configuration for scheduling in the first cell, wherein the second configuration is associated with a second search space in a second cell different from the first cell, and wherein the second cell is associated with a second SCS different from the first SCS; determining a number of blind detections (BDs) based on at least one of the first SCS or the second SCS; and monitoring, based on the number of BDs, for downlink control information (DCI) in the first search space and the second search space.

According to another aspect of the present disclosure, a method of wireless communication performed by a base station (BS) includes: transmitting, to a user equipment (UE), a first configuration for scheduling in a first cell, wherein the first configuration is associated with a first search space in the first cell, and wherein the first cell is associated with a first subcarrier spacing (SCS); transmitting, to the UE, a second configuration for scheduling in the first cell, wherein the second configuration is associated with a second search space in a second cell different from the first cell, and wherein the second cell is associated with a second SCS different from the first SCS; transmitting, to the UE, a third configuration indicating a third SCS associated with a number of downlink control information (DCI) blind detections (BDs) in the first search space and the second search space, wherein the third SCS corresponds to one of the first SCS or the second SCS; and transmitting, to the UE, DCI in at least one of the first search space or the second search space based on the number of DCI BDs.

According to another aspect of the present disclosure, a UE includes a transceiver configured to: receive, from a base station (BS), a first configuration for scheduling in a first cell, wherein the first configuration is associated with a first search space in the first cell, and wherein the first cell is associated with a first subcarrier spacing (SCS); and receive, from the BS, a second configuration for scheduling in the first cell, wherein the second configuration is associated with a second search space in a second cell different from the first cell, and wherein the second cell is associated with a second SCS different from the first SCS. The UE further includes a processor configured to: determine a number of blind detections (BDs) based on at least one of the first SCS or the second SCS; and monitor, based on the number of BDs, for downlink control information (DCI) in the first search space and the second search space.

According to another aspect of the present disclosure, a BS includes a transceiver configured to: transmit, to a user equipment (UE), a first configuration for scheduling in a first cell, wherein the first configuration is associated with a first search space in the first cell, and wherein the first cell is associated with a first subcarrier spacing (SCS); transmit, to the UE, a second configuration for scheduling in the first cell, wherein the second configuration is associated with a second search space in a second cell different from the first cell, and wherein the second cell is associated with a second SCS different from the first SCS; transmit, to the UE, a third configuration indicating a third SCS associated with a number of downlink control information (DCI) blind detections (BDs) in the first search space and the second search space, wherein the third SCS corresponds to one of the first SCS or the second SCS; and transmit, to the UE, DCI in at least one of the first search space or the second search space based on the number of DCI BDs.

According to another aspect of the present disclosure, a non-transitory computer-readable medium has program code recorded thereon, the program code including: code for causing a user equipment (UE) to receive, from a base station (BS), a first configuration for scheduling in a first cell, wherein the first configuration is associated with a first search space in the first cell, and wherein the first cell is associated with a first subcarrier spacing (SCS); code for causing the UE to receive, from the BS, a second configuration for scheduling in the first cell, wherein the second configuration is associated with a second search space in a second cell different from the first cell, and wherein the second cell is associated with a second SCS different from the first SCS; code for causing the UE to determine a number of blind detections (BDs) based on at least one of the first SCS or the second SCS; and code for causing the UE to monitor, based on the number of BDs, for downlink control information (DCI) in the first search space and the second search space.

According to another aspect of the present disclosure, a non-transitory computer-readable medium has program code recorded thereon, the program code including: code for causing a base station (BS) to transmit, to a user equipment (UE), a first configuration for scheduling in a first cell, wherein the first configuration is associated with a first search space in the first cell, and wherein the first cell is associated with a first subcarrier spacing (SCS); code for causing the BS to transmit, to the UE, a second configuration for scheduling in the first cell, wherein the second configuration is associated with a second search space in a second cell different from the first cell, and wherein the second cell is associated with a second SCS different from the first SCS; code for causing the BS to transmit, to the UE, a third configuration indicating a third SCS associated with a number of downlink control information (DCI) blind detections (BDs) in the first search space and the second search space, wherein the third SCS corresponds to one of the first SCS or the second SCS; and code for causing the BS to transmit, to the UE, DCI in at least one of the first search space or the second search space based on the number of DCI BDs.

According to another aspect of the present disclosure, a UE includes: means for receiving, from a base station (BS), a first configuration for scheduling in a first cell, wherein the first configuration is associated with a first search space in the first cell, and wherein the first cell is associated with a first subcarrier spacing (SCS); means for receiving, from the BS, a second configuration for scheduling in the first cell, wherein the second configuration is associated with a second search space in a second cell different from the first cell, and wherein the second cell is associated with a second SCS different from the first SCS; means for determining a number of blind detections (BDs) based on at least one of the first SCS or the second SCS; and means for monitoring, based on the number of BDs, for downlink control information (DCI) in the first search space and the second search space.

According to another aspect of the present disclosure, a BS includes: means for transmitting, to a user equipment (UE), a first configuration for scheduling in a first cell, wherein the first configuration is associated with a first search space in the first cell, and wherein the first cell is associated with a first subcarrier spacing (SCS); means for transmitting, to the UE, a second configuration for scheduling in the first cell, wherein the second configuration is associated with a second search space in a second cell different from the first cell, and wherein the second cell is associated with a second SCS different from the first SCS; means for transmitting, to the UE, a third configuration indicating a third SCS associated with a number of downlink control information (DCI) blind detections (BDs) in the first search space and the second search space, wherein the third SCS corresponds to one of the first SCS or the second SCS; and means for transmitting, to the UE, DCI in at least one of the first search space or the second search space based on the number of DCI BDs.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
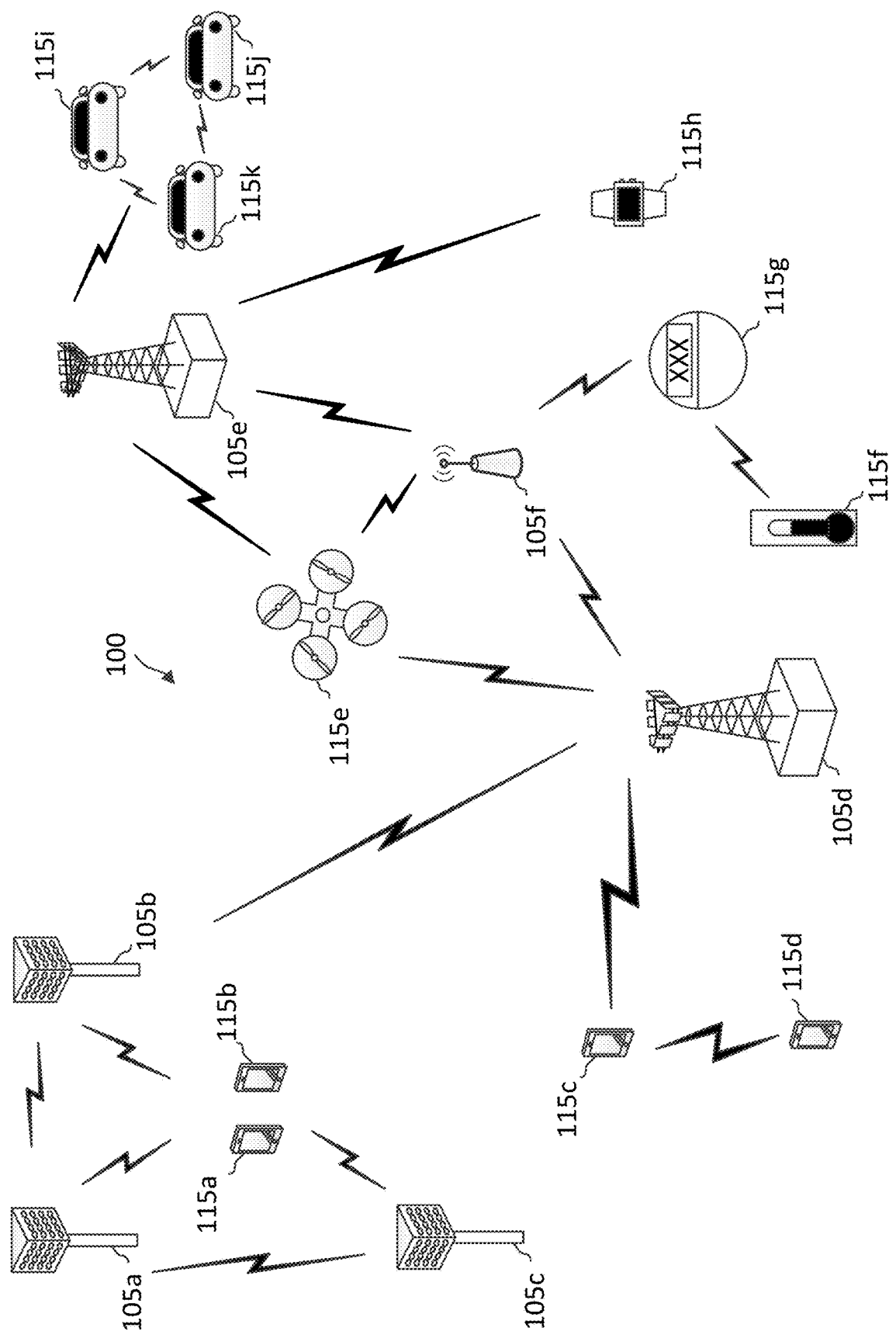
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may schedule a UE for UL communications and/or DL communications by transmitting UL scheduling grants and/or DL scheduling grants, respectively, to the UE. The UL scheduling grants and/or DL scheduling grants may be in the form of downlink control information (DCI). The BS may configure the UE with search spaces (time-frequency resource regions) where the BS may transmit UL and/or DL scheduling grants. Accordingly, the UE may monitor the search spaces for UL and/or DL scheduling grants from the BS. In some aspects, the BS may transmit DCI in a search space using various combination of resources in the search space (e.g., including control channel element (CCE) arrangements and/or aggregation level (AL)) within the search space, and the UE may perform blind decoding in the search space based on the resource configurations to detect for DCI. For example, the number of blind decoding that the UE may perform in a search space may correspond to the number of potential combinations that the BS may use for transmitting DCI in the search space. In some examples, a search space may repeat in time according to a certain periodicity. The BS may configure the UE with a monitoring configuration, for example, including DCI monitoring occasions corresponding to the time location of the search space, a monitoring periodicity corresponding to the periodicity of the search space, and/or a number of blind decodes corresponding to the number of potential combinations of resources.

In order to transfer data at a higher rate, a UE and a BS may communicate over multiple frequency bands in parallel (a form of carrier aggregation (CA)). In this configuration, one of the bands can be associated with a primary cell (Pcell) and another with a secondary cell (Scell). One or more of the Pcell or Scell may be used as a scheduling cell, in which a BS may transmit control channel information indicating scheduling grant or resource allocations (a location of DL/UL data resources) in another cell, referred to as the scheduled cell. In one example, the UE may monitor for DCI on a scheduling cell, where the DCI indicates that downlink data (e.g., in PDSCH) will be scheduled or transmitted on a scheduled cell. This may be referred to as "cross-carrier scheduling." In addition, the UE may also monitor for DCI on the scheduling cell for self-scheduling DL data on the scheduling cell.

As used herein, the term "cross-carrier scheduling" may refer to a BS transmitting a scheduling grant (DCI) in one cell for a schedule in another cell. As used herein, the term "self-scheduling" may refer to a BS transmitting a scheduling grant (DCI) in a cell for a schedule in the same cell. As used herein, the term "scheduling cell" may refer to a cell where a schedule is communicated. As used herein, the term "scheduled cell" may refer to a cell where a UL and DL communication is being scheduled. As used herein, the terms "search space" and "search space sets" may refer to a set of DCI candidates or physical downlink control channel (PDCCH) candidates where a UE may monitor for a scheduling grant (e.g., DCI). As used herein, the terms "number of blind decoding (BD)" may refer to the number of PDCCH candidates that a UE may monitor in a search space and may be associated with the number of non-overlapping control channel elements (CCEs) in the search space.

In 5G NR, the scheduling cell and scheduled cell may be associated with different subcarrier spacings (SCSs). For example, if an Scell is the scheduling cell, the scheduling cell/Scell may have an SCS of 30 kHz, and the scheduled cell/Pcell may have an SCS of 15 kHz. The monitoring configuration (e.g., monitoring occasion periodicity, number of blind decodes) used by the UE to identify DCI may be based on the scheduling cell's SCS. When a CA system utilizes cross-carrier scheduling with a single scheduling cell, search spaces and/or DCI monitoring may be configured based on the SCS of the scheduling cell. For instance, a Pcell in the CS system may be a scheduling cell that provides schedules for the Pcell and one or more Scells in the CA system.

In some situations, it may be desirable to offload some of the scheduling operations to a Scell to ease traffic loading in the Pcell. However, Pcell is commonly used as anchor cell where system information is being communicated. Thus, the Pcell may also communicate scheduling information for communications in the Pcell. In other words, communications in the Pcell (the scheduled cell) may be based on schedules communicated in the Pcell and/or Scell. Thus, a UE may monitor for DCI in the Pcell as well as in the Scell for schedules to communicate in the Pcell. As discussed above, the number of BDs the UE performs (the number of PDCCH candidates the UE monitors) in DCI monitoring may be dependent on the SCS of the scheduling cell. However, since DL/UL transmissions on a cell may be scheduled by two or more different cells associated with two or more different SCSs, the UE may not know which SCS is to be used to determine the number of BDs for monitoring in the scheduling cells. Accordingly, if the BS transmits DCI such that it can be successfully decoded using a number of BDs associated with a first scheduling cell's SCS, but not the second scheduling cell's SCS, it is possible that the UE cannot decode the DCI without exceeding certain BD and/or CCE budgets, for example, associated with a capability of the UE.

Aspects of the present disclosure provide mechanisms for monitoring for control channel information (e.g., DCI) by performing a number of BDs, where the number of BDs is determined based on an SCS associated with at least one of the scheduling cells. For example, the UE may be configured to determine the number of BDs based on a lower SCS or a higher SCS of the scheduling cells' SCSs. In another aspect, the UE is configured to determine the number of BDs based on an SCS explicitly configured in RRC signaling. By configuring the UE to determine the number of BDs based on a selected one of the scheduling cells' SCSs, the UE can monitor for DCI on scheduling cells having different SCS, and ensure that the DCI can be successfully decoded or detected within the determined BD and/or CCE limits.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may be an NR network supporting carrier aggregation (CA) of component carriers (CCs) associated with various subcarrier spacings (SCSs). The network 100 may further support dynamic spectrum sharing (DSS) and cross-carrier scheduling between serving cells having different SCSs.

Figure 2:
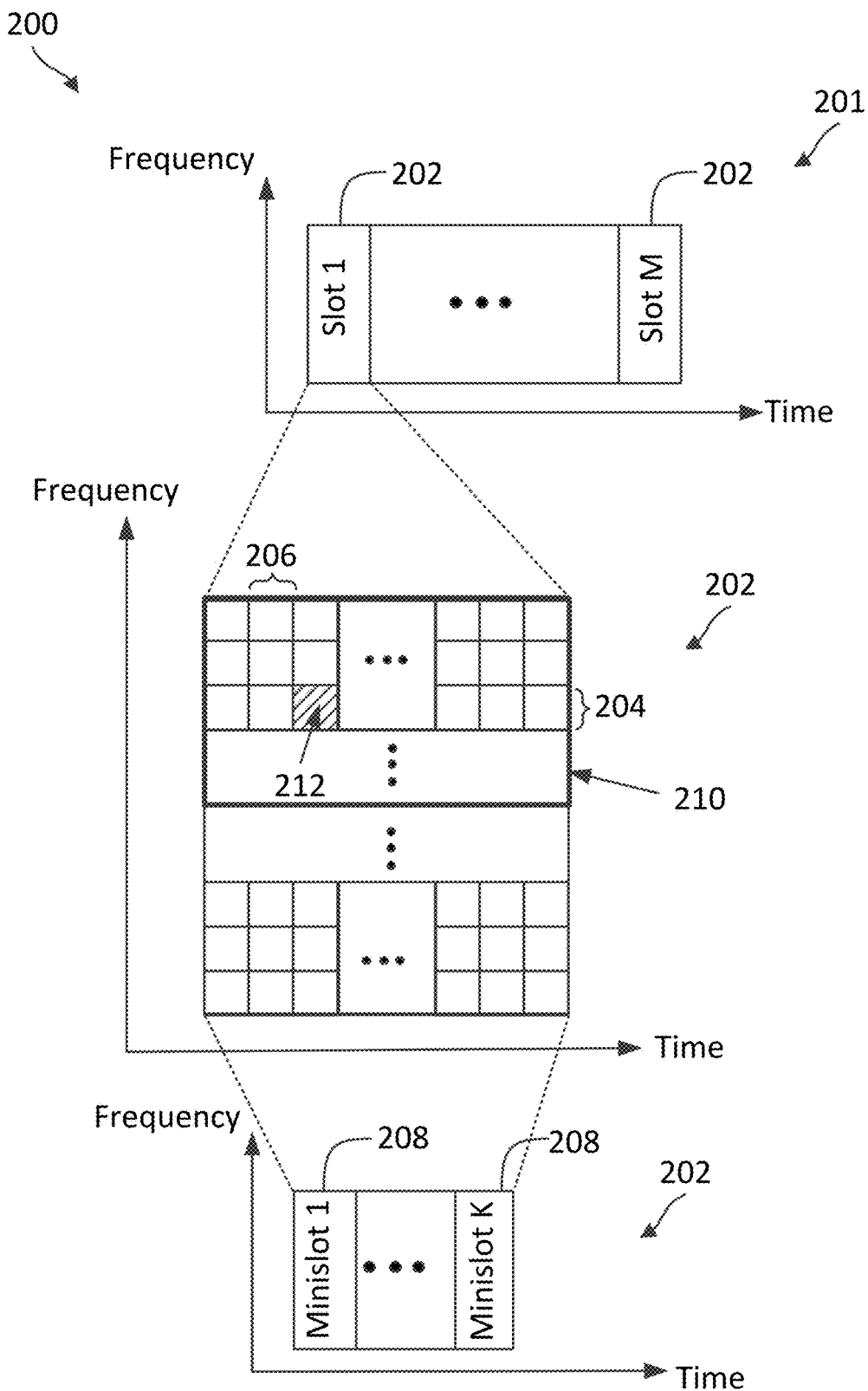
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel BW, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
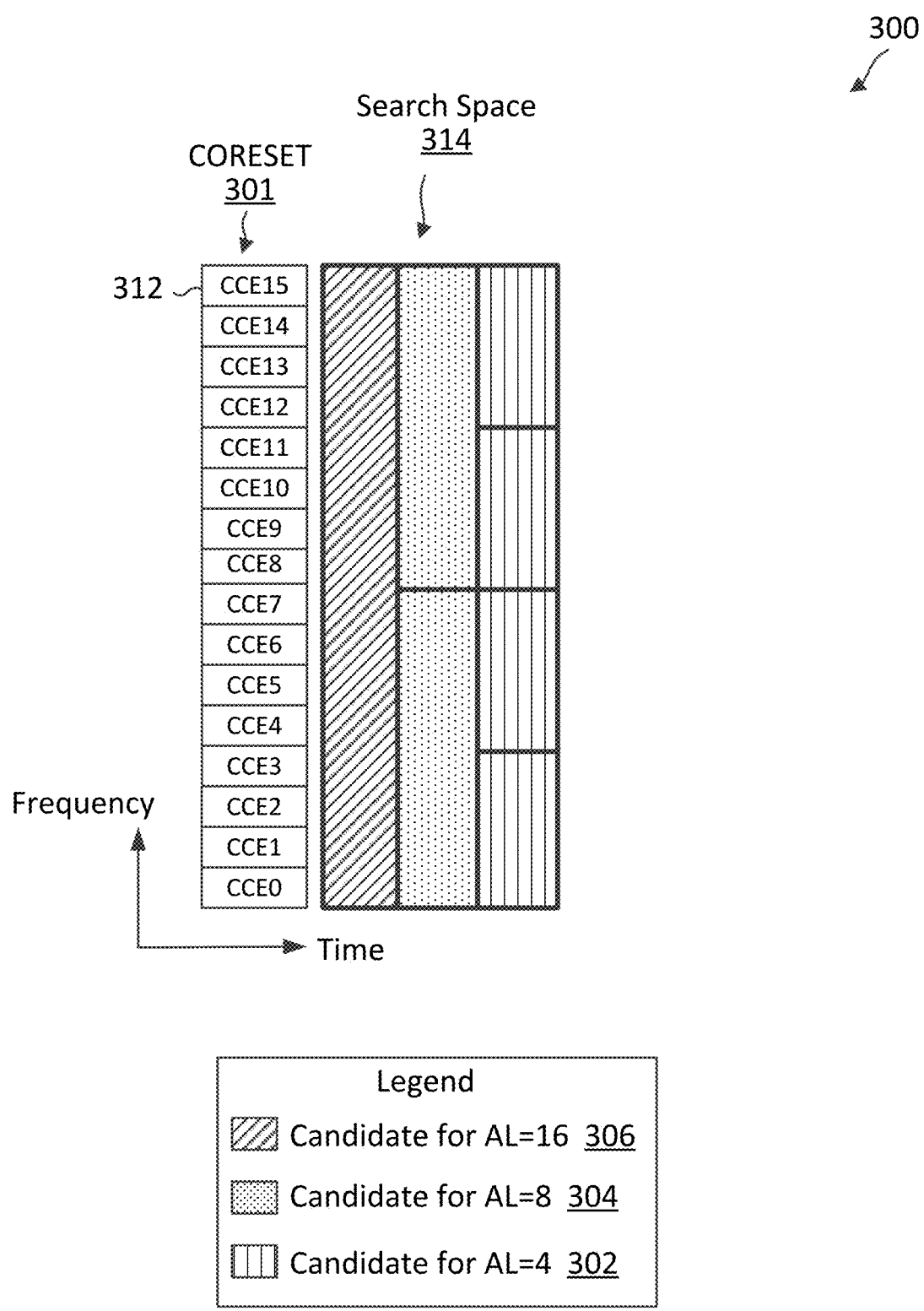
FIG. 3 illustrates a common control resource set (CORESET) blind detection scheme according to some aspects of the present disclosure.

FIG. 3 illustrates a common CORESET configuration scheme 300 according to some aspects of the present disclosure. The scheme 300 may be employed by BSs such as the BSs 105 and UEs such as the UEs 115 in a network such as the network 100 for communications. In particular, the BS may communicate PDCCH with a UE using time-frequency resources configured as shown in the scheme 300. The x-axis represent time in some arbitrary units, and the y-axes represent frequency in some arbitrary units.

A CORESET is a set of physical time-frequency resources where a BS (e.g., the BSs 105) may transmit PDCCH to provide scheduling information and/or any DL control information to UEs (e.g., the UEs 115) in a network (e.g., the network 100). Referring to FIGS. 2 and 3, a CORESET may span, for example, multiples of non-contiguous or contiguous groups of six RBs (e.g., the RBs 210) in frequency and between one to three contiguous OFDM symbols (e.g., the symbols 206) in time. In the time domain, a CORESET may be up to three OFDM symbols in duration and located anywhere within a slot (e.g., at a beginning of a slot). In the frequency domain, a CORESET may be defined in multiples of six RBs up to the system carrier frequency BW (e.g., a channel frequency BW).

Referring to FIG. 3, the CORESET 301 includes sixteen CCEs 312. The CCEs 312 may be indexed from 0 to 15 (shown as CCE1 to CCE15). The CORESET 301 is a CORESET #0. Each CCE 312 include six resource element groups (REGs), where a REG is defined as on physical RB in one symbol. In some aspects, the CORESET 301 may span 96 RBs (e.g., RBs 210) with an SCS of 15 kHz in frequency and one symbol (e.g., the symbols 206) in time. In other words, each CCE 312 may span 6 RBs in frequency and one symbol in time. In some other aspects, the CORESET 301 may span 48 RBs with an SCS of 30 kHz in frequency and two symbols in time. In other words, each CCE 312 may span 3 RBs in frequency and 2 symbols in time.

A BS (e.g., the BSs 105) may transmit an RRC information element (e.g., MIB, SIB schedule) including a search configuration for a PDCCH search space 314 associated with the CORESET 301 using an aggregation of four CCEs 312, an aggregation of eight CCEs 312, or an aggregation of sixteen CCEs 312. The PDDCH search space is an instance of the CORESET in a certain slot. An aggregation of four CCEs 312 may be referred to as an aggregation level (AL) of 4. An aggregation of eight CCEs 312 may be referred to as an AL of 8. An aggregation of sixteen CCEs 312 may be referred to as an AL of 16. The higher the AL, the more redundancy and more frequency diversity can be provided by the PDCCH transmission, and thus the more robust the PDCCH transmission may be. A UE (e.g., the UEs 115) may monitor the search space 314 by performing blind decoding to search for a PDCCH candidate in the search space 314 based on an aggregation level (AL) of 4, 8, or 16. The PDCCH monitoring for SIB scheduling is a PDCCH type-0 monitoring. In some aspects, as part of the PDCCH blind decoding, a UE may decode one candidate for an AL of 16, two candidates for an AL of 8, and four PDCCH candidates for an AL of 4 in the PDCCH search space. In some aspects, the PDCCH candidates in a CORESET 301 are mapped to the CCEs 312 as shown below:

$$L \times \left\{ \left[ \frac{m \times N_{CCE}}{L \times M_{max}^{(L)}} \right] \bmod \left[ \frac{N_{CCE}}{L} \right] \right\} + i, \qquad (1)$$

where $N_{CCE}$ represents the number of CCEs 312 in the CORESET 301, L represents the AL, i may vary from 0 to L−1, and $M_{max}^{(L)}$ max represents the maximum number of PDCCH candidates for a certain AL. According to equation (1), the candidate 302 of AL 16 is mapped to CCEs 312 indexed 0 to 15, the two candidates 304 are mapped to CCEs 312 indexed 0 to 7 and CCEs 312 indexed 8 to 15, and the four candidates 306 are mapped to CCEs 312 indexed 0 to 3, CCEs 312 indexed 4 to 7, CCEs 312 indexed 8 to 11, and CCEs 312 indexed 12 to 15.

Figure 4:
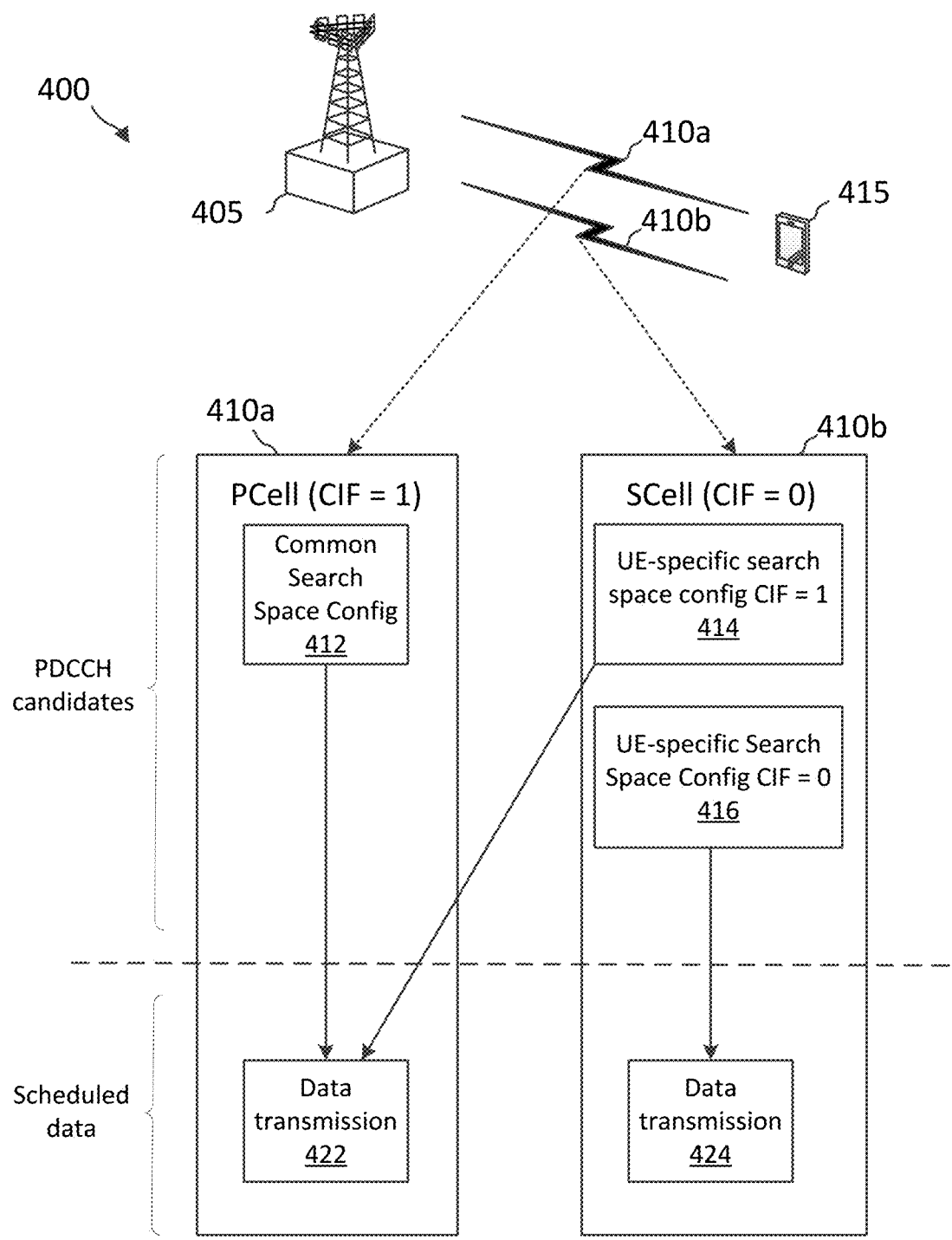
FIG. 4 illustrates a cross-carrier scheduling scheme according to some aspects of the present disclosure.

FIG. 4 is a diagram of a cross-carrier scheduling scenario 400 performed by a BS 405 and a UE 415. The BS 405 may be one of the BSs 105, and the UE 415 may be one of the UEs 115 in the network 100. The BS 405 and the UE 415 communicate using a carrier aggregation (CA) scheme such that the UE 415 can receive DL data and/or transmit UL data on two different serving cells: a first cell 410a and a second cell 410b. In FIG. 4, the first cell 410a is a primary cell (Pcell), and the second cell 410b is a secondary cell (Scell), where the Pcell and Scell are different frequency carriers. The BS 405 may schedule the UE 415 via the first cell 410a for communications in the first cell 410a (self-scheduling). The BS 405 may also schedule the UE 415 via the second cell 410b for communications in the first cell 410a (cross-carrier scheduling). For instance, the BS 405 may configure one or more DCI search spaces (including PDCCH candidates similar to the search space 314) in each of the first cell 410a and second cell 410b. For instance, the BS 405 may configure the UE with a search space configuration for each search space. In the illustrated example, the BS 405 may configure the UE 415 with a common search space (including PDCCH candidates similar to the search space 314) in the first cell 410a and two UE-specific search spaces (including PDCCH candidates) in the second cell 410b. A commons search space may refer to a search space for monitoring by a group of UEs. A UE-specific search space may refer to a search space for monitoring by a specific UE. For instance, the BS 405 may configure UE 415 with a common search space configuration 412 for monitoring the common search space in the first cell 410a, and UE-specific search space configurations 416 for monitoring the UE-specific search spaces in the second cell 410b. Accordingly, the UE 415 monitors for DCI in each of the first cell 410a and the second cell 410b using corresponding search space configurations 412, 414, 416. The first and second cells 410a, 410b are associated with respective carrier indicator fields (CIFs) (e.g., CIF=1 for the first cell 410a, CIF=0 for the second cell 410b). In the first cell 410a, the UE 415 monitors for DCI by attempting to decode one or more PDCCH candidates using a common search space configuration 412. The UE 415 may be configured with the common search space configuration for the first cell 410a by receiving an RRC information element (e.g., a SIB) from the BS 405 indicating the common search space configuration 412. The BS 405 may determine the common search space configuration 412 based on an SCS of the first cell 410a. In the illustrated example, the SCS of the first cell 410a may be 15 kHz. As will be further explained below, the search space configurations used by the UE 415 may indicate a monitoring occasion periodicity, a duration of the monitoring occasions, an offset of the monitoring occasions, or any other suitable monitoring parameter. Accordingly, the UE 415 may monitor for DCI in a search space in the first cell 410a based on the parameters of the common search space configuration 412. In response to identifying/decoding the DCI, the UE 415 may detect DL data and/or schedule UL data (Data transmission 422) on the first cell 410a based on scheduling information provided in the DCI. In some aspects, DCI for cross-carrier scheduling may include a UL or DL communication schedule and a CIF to indicate a cell (or carrier) where the communication is being scheduled.

The UE 415 also monitors for DCI in the second cell 410b. The UE 415 is configured with two UE-specific search space configurations 414, 416 for the second cell 410b. One or both of the UE-specific search space configurations 414, 416 may be associated with the SCS of the second cell 410b. In the illustrated example, the SCS of the second cell 410b may be 30 kHz. A first UE-specific search space configuration 414 for the Pcell (CIF=1) includes a first set of monitoring parameters, such as monitoring occasion periodicity, a duration of the monitoring occasions, an offset of the monitoring occasions, or any other suitable monitoring parameter. The UE 415 monitors for DCI in a first search space (configured by the configuration 414) within the second cell 410b based on the parameters of the first UE-specific search space configuration 414. In response to identifying/decoding the DCI, the UE 415 may receive DL data, and/or transmit UL data (data transmission 422) in the first cell 410a based on scheduling information provided in the DCI. Accordingly, it will be understood that the data transmission 422 can potentially be scheduled be either the Pcell 410a or the Scell 410b.

A second UE-specific search space configuration 416 for the Scell (CIF=0) includes a second set of monitoring parameters, such as monitoring occasion periodicity, a duration of the monitoring occasions, an offset of the monitoring occasions, or any other suitable monitoring parameter. The UE 415 monitors for DCI in a second search space (configured by the configuration 416) within the second cell 410b based on the parameters of the second UE-specific search space configuration 416. In response to identifying/decoding the DCI, the UE 415 may receive DL data (e.g., data transmission 424) and/or transmit UL data in the second cell 410b (e.g., data transmission 422) based on scheduling information provided in the DCI. Accordingly, the UE 415 may monitor, in one serving cell (e.g., Scell 410b), for DCIs associated with the same serving cell and/or a different serving cell (e.g., Pcell 410a). In some aspects, UL resources may be available on the Pcell 410a, but not the Scell 410b. Further, in some aspects, DL data may be scheduled on both the Pcell 410a and the Scell 410b.

Figure 5A:
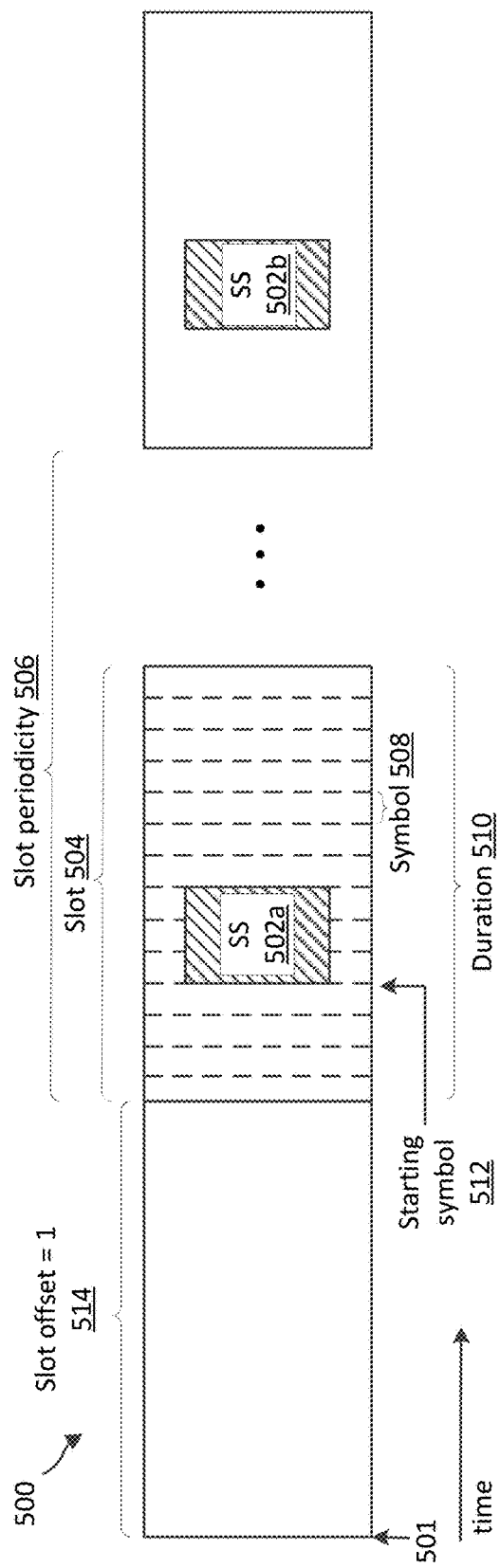
FIG. 5A is a timing diagram illustrating a control channel monitoring scheme according to some aspects of the present disclosure.
Figure 5B:
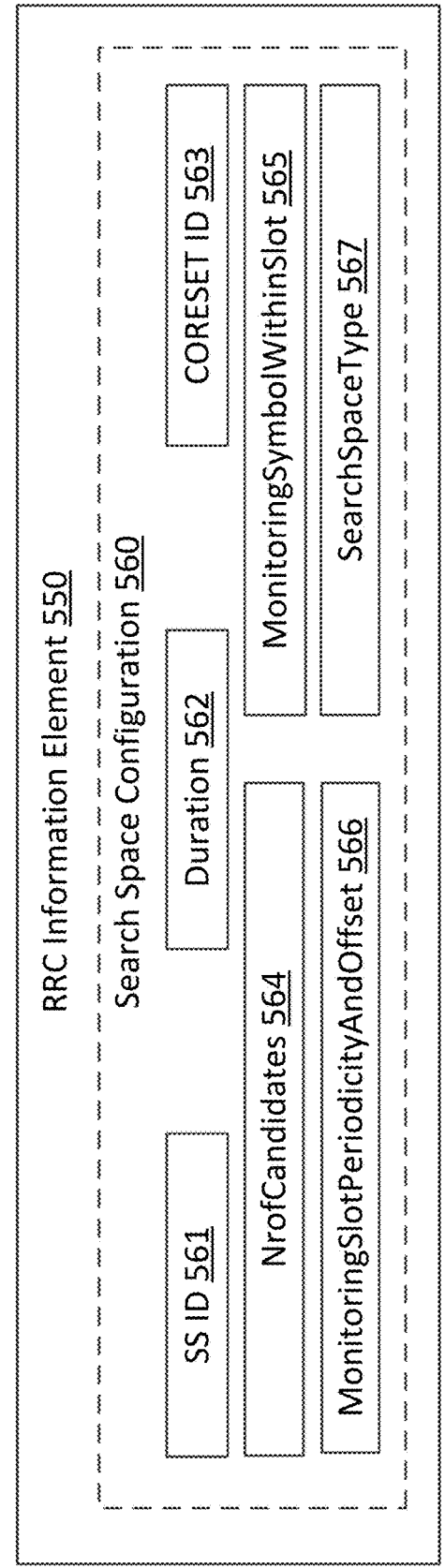
FIG. 5B illustrates a radio resource control (RRC) information element indicating a search space configuration according to some aspects of the present disclosure.

FIGS. 5A and 5B illustrate a search space configuration, according to some aspects of the present disclosure. In particular, FIG. 5A is a timing diagram illustrating a DCI monitoring scheme 500 using a search space configuration, and FIG. 5B illustrates components of an RRC information element 550 including a search space configuration 560. The scheme 500 may be employed by UEs such as the UEs 115, 415 in a network such as the network 100 for communications. The scheme 500 is performed based on parameters of the search space configuration 560.

Referring to FIG. 5A, the DCI monitoring scheme 500 includes a UE (e.g., a UE 115 or 415) periodically monitoring for PDCCH candidates from a BS, such as one of the BSs 105, 405, within search spaces 502 (shown as 502a and 502b). The search spaces 502a and 502b may correspond to a search space (e.g., the search space 314) associated with a CORESET (e.g., the CORESET 301) that repeats in time. For instance, the search spaces 502a, 502b are based on various periodicity and timing parameters, including a slot periodicity 506, a slot offset 514, a starting symbol 512, and other parameters. In the illustrated embodiment, the DCI monitoring scheme 500 is configured with a slot offset 514 of 1 slot from a reference time 501 (e.g., a start of a radio frame 201). The slots 504 may be indexed (e.g., from 0 to 9, 0 to 19). The first search space 502a occurs in a second slot 504, with a slot index 1 in a given radio frame. In some aspects, the slot offset 514 may be set based on a monitoringSlotPeriodicityAndOffset parameter 566 indicated in the search space configuration 560.

Each slot 504 includes a plurality of symbols 508. In FIG. 5A, each slot 504 has 14 symbols, with indices ranging from 0 to 13. However, other configurations are also possible, including slots having seven symbols, for example.

The search spaces 502a occur every N slots, where N is an integer associated with a slot periodicity 506. In some aspects, N may be 1, 2, 3, 4, 5, 7, 10, or any other suitable integer, both greater or smaller. The slot periodicity 506 may be set based on the monitoringSlotPeriodicityAndOffset parameter 566 indicated in the search space configuration 560. In some aspects, the slot periodicity 506 may be based on or associated with an SCS of the scheduling/monitoring cell. In some aspects, a serving cell having a higher SCS (e.g., 30 kHz, 120 kHz), may be configured with a smaller slot periodicity, such that monitoring occasions are more frequent compared to monitoring occasions in a cell having a lower SCS (e.g., 15 kHz).

The search spaces 502a, 502b begin at a starting symbol 512 within the slot 504. The starting symbol 512 may be set based on a monitoringSymbolWithinSlot parameter 565 indicated in the search space configuration 560. The starting symbol 512 may be based on or associated with an SCS of the scheduling/monitoring cell, in some aspects.

The search spaces 502a, 502b may be associated with a monitoring occasion duration 510, which indicates a number of consecutive slots where the search spaces 502 may be present. In some aspects, the duration 510 is N slots, where N is an integer. In the illustrated example, N is 1. The duration may be set or based on a parameter of the search space configuration 560.

In some aspects, the RRC information element 550 may be transmitted by the BS to the UE as part of system information (e.g., in a MIB to provide SIB scheduling information), as part of an initial network access procedure, or as part of normal operation, in some aspects. The search space configuration 560 includes other parameters, such as a search space identifier 561, a duration 562, a CORESET ID 563, a NrOfCandidates parameter 564, and a search space type parameter 567. In some aspects, a BS may configure a UE up to about three CORESETs and up to about ten search spaces, each instantiated from one of the CORESETs.

In some aspects, a BS may configure a UE with one active BWP at any given time for each of the Pcell or Scell. The BS may transmit an RRC message to the UE including a BWP configuration for communications over a certain BWP, for example, in the Pcell. The BWP configuration may include one or more search configurations similar to the search space configuration 560s providing the UE with DCI monitoring occasions for scheduling transmissions in the BWP of the Pcell. Similarly, the BS may configure the UE with an active BWP in the Scell using similar mechanisms.

Figure 6:
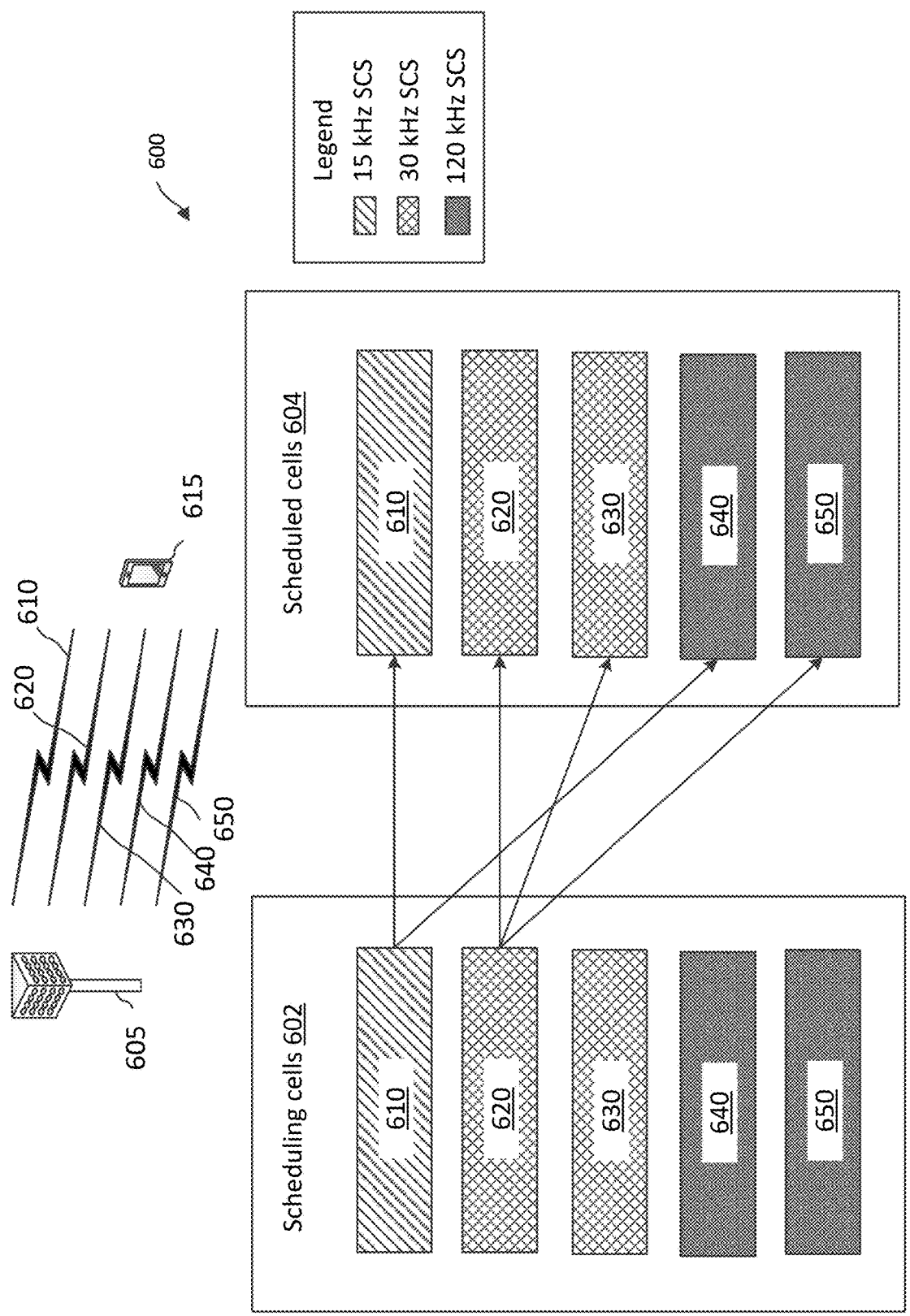
FIG. 6 illustrates a cross-carrier scheduling scheme according to some aspects of the present disclosure.

FIG. 6 illustrates a cross-carrier scheduling scheme 600 according to aspects of the present disclosure. The scheme 600 is employed by a UE 615, which may be one of the UEs 115, 415 in a network such as the network 100 for communications. The scheme 600 may be performed based on parameters of the search space configuration 560 indicated in the RRC information element 550 described above in FIG. 5B. Referring to FIG. 6, a UE, such as one of the UEs 115 or 415, may be connected to a BS 605, which may be one of the BSs 105 or 405, via multiple serving cells. In the illustrated scenario, the UE 615 is connected to the BS 605 via five cells: a first cell 610, a second cell 620, a third cell 630, a fourth cell 640, and a fifth cell 650. In some aspects, each cell may be associated with a carrier indicator field (CIF) value, which may range from CIF=0 to CIF=4, in this scenario. For example, the first cell 610 may be a Pcell, and may have a CIF of 0. The second cell 620 may be a first Scell, and may have a CIF of 1. The third cell 630 may be a second Scell, and may have a CIF of 2.

The cells may operate scheduling cells 602 and/or scheduled cells 604. In FIG. 6, the first cell 610 and the second cell 620 are scheduling cells 602. However, it will be understood that other configurations are also contemplated by the present disclosure, such as a single scheduling cell 602, or more than two scheduling cells 602. The shading or pattern of each of the cells indicates the SCS of that cell, as shown in the legend. Accordingly, in FIG. 6, the first cell 610 is associated with an SCS of 15 kHz, the second and third cells 620, 630 are associated with an SCS of 30 kHz, and the fourth and fifth cells 640, 650 are associated with an SCS of 120 kHz. Each scheduled cell 604 is scheduled by a single one of the scheduling cells 602. For example, the first cell 610 is the sole scheduling cell for the first cell 610. In other words, the first cell 610 is a self-scheduling cell. Similarly, the second cell 620 is the sole scheduling cell for the second cell 620. The second cell 620 is also the scheduling cell for the third and fifth cells 630, 650. The first cell 610 is also the scheduling cell for the fourth cell 640.

As explained above, the UE 615 may monitor for control channel information (e.g., DCI) on the scheduling cells 602. The UE 615 monitors for the control channel information based on search parameters associated with each of the cells. Some of the search parameters may be configured by the BS 605 in a search space configuration, such as the configuration 560 shown in FIG. 5B. Further, the UE 715 may monitor for the control channel information by searching a number of PDCCH candidates or, performing a number of blind decodes (BDs) to identify/decode the control channel information. Further, the search parameters may indicate a maximum number of PDCCH candidates (CCEs) for each aggregation level. In one aspect, the UE 615 is expected to perform a maximum number of BDs across more than one cell or component carrier. The maximum number of BDs the UE 615 is expected to perform for a scheduled cell (per frequency carrier) may be determined based on the following relationships:

$$\min(M_{PDCCH}^{max,slot,\mu}, MM_{PDCCH}^{max,slot,\mu}), \text{ where} \quad (2)$$

$$MM_{PDCCH}^{max,slot,\mu} = N\left(MM_{PDCCH}^{max,slot,\mu} \times \frac{N_{cells}^{DL,\mu}}{\sum_{j=0}^{3} N_{cells}^{DL,j}}\right), \quad (3)$$

and where $M_{PDCCH}^{max,slot,\mu}$ is the maximum number of BDs per slot based on the scheduling cell's SCS configuration ($\mu$), $N_{cells}^{DL,\mu}$ is the number of scheduled cells associated with or scheduled by a scheduling cell having the SCS configuration $\mu$, and $\Sigma_{j=0}^{3}N_{cells}^{DL,j}$ is the total number of scheduled cells. Similarly, the maximum number of non-overlapping CCEs that a UE 615 can perform for a scheduled cell may be determined based on the following relationships:

$$\min(C_{PDCCH}^{max,slot,\mu}, CC_{PDCCH}^{max,slot,\mu}), \text{ where} \quad (4)$$

$$CC_{PDCCH}^{max,slot,\mu} = N\left(C_{PDCCH}^{max,slot,\mu} \times \frac{N_{cells}^{DL,\mu}}{\sum_{j=0}^{3} N_{cells}^{DL,j}}\right), \quad (5)$$

and where $C_{PDCCH}^{max,slot,\mu}$ is the maximum number of CCEs per slot based on the scheduling cell's SCS configuration ($\mu$), $N_{cells}^{DL,\mu}$ is the number of scheduled cells associated with or scheduled by a scheduling cell having the SCS configuration $\mu$, and $\Sigma_{j=0}^{3}N_{cells}^{DL,j}N^{DL,j}$ is the total number of scheduled cells.

In some aspects, the BS 605 configures the UE 615 such that the UE 615 may not perform, for each Scell, more BDs than equations (2)-(5) provide. However, in some instances for a Pcell or a P(S) cell, the BS may configure the UE 615 to perform more BDs than the equations (2)-(5) provide. In such instances, the UE 615 may drop or prune some search spaces or search space sets that exceed the maximum BD/CCE numbers.

Referring again to FIG. 6, the UE 615 may monitor for scheduling grants (e.g., DCI) for a scheduled cell 604 by performing BD in a scheduling cell 602. The number of BDs performed by the UE 615 monitoring for DCI is determined for each scheduled cell, but is based on the SCS of the scheduling cell (u), and further based on a total number of scheduled cells (e.g., corresponding to the number of cells that the BS 605 uses to serve the UE 615), a number of cells scheduled by a scheduling cell, and/or a capability of the UE 615. As each scheduled cell is associated with a single scheduling cell in the scenario of FIG. 6, the number of BDs that the UE 615 performs when monitoring for DCI scheduling DL/UL data transmissions on the scheduled cell can be determined based on the scheduling cell's SCS.

As an example, each of the first cell 610 and the fourth cell 640 is scheduled by the first cell 610 with an SCS of 15 kHz. In some aspects, the maximum number of BDs expected to be performed by the UE 615 for a scheduling cell with a SCS of 15 kHz is 44. The total number of scheduled cells 604 is 5 (the cells 610-650). The number of scheduled cells 604 scheduled by the scheduling cell 610 is 2 (the cells 610 and 640). Thus, the number of BDs to be performed for DCI monitoring for scheduling each of the first cell 610 and the fourth cell 640 may be determined according to equations (2) and (3) by substituting the total number of scheduled cells (which is 5) and the number of scheduled cells scheduled by the cell 610 (which is 2) per slot (e.g., 1 ms slot based on 15 kHz SCS) as shown below:

$$\text{Min}\{44, R \times 44 \times 2/5\}, \quad (6)$$

where R may represent the number of scheduling cells that the UE 615 may support, for example, based on a capability report of the UE 615. When R is 2, equation (6) may be evaluated to be about 35. In other others, the UE 615 may perform a maximum of 35 BDs per slot for each of the scheduled cells 610 and 640.

Similarly, each of the second cell 620, third cell 630, and fifth cell 650610 and the fourth cell 640 is scheduled by the second cell 620 with an SCS of 30 kHz. In some aspects, the maximum number of BDs expected to be performed by the UE 615 for a scheduling cell with a SCS of 30 kHz is 35. The total number of scheduled cells 604 is 5 (the cells 610-650). The number of scheduled cells 604 scheduled by the scheduling cell 620 is 3 (the cells 620, 230, and 650). Thus, the number of BDs to be performed for DCI monitoring for scheduling each of the cells 620, 630, and 650 may be determined according to equations (2) and (3) by substituting the total number of scheduled cells (5) and the number of scheduled cells scheduled by the cell 620 (3) per slot (e.g., 0.5 ms slot based on 30 kHz SCS) as shown below:

$$\text{Min}\{36, R \times 36 \times 3/5\}, \quad (7)$$

where R may represent the number of scheduling cells that the UE 615 may support, for example, based on a capability report of the UE 615. When R is 2, equation (7) may be evaluated to be about 35. In other others, the UE 615 may perform a maximum of 36 BDs per slot for each of the scheduled cells 620, 630, and 650.

However, in some aspects, such as DSS and CA, DCI associated with a scheduled cell (e.g. Pcell) may be transmitted on more than one scheduling cell (e.g., Pcell and Scell). Further, the two or more scheduling cells for processing PDCCH candidates may be associated with different SCSs. For example, DL/UL data transmissions on a Pcell may be self-scheduled on the Pcell, or alternatively may be cross-carrier scheduled on an Scell. The Pcell may have a first SCS, and the Scell may have a different second SCS. For example, the SCS of the Pcell may be 15 kHz, and the SCS of the Scell may be 30 kHz, for example. Accordingly, using the relationships described above, there are two possibilities for determining the number of BDs to perform based on the two SCSs of the scheduling cells. It is desirable that the BS 605 transmits DCI such that it can be decoded by the UE 615 within the determined number of BDs. The present disclosure describes mechanisms for determining a number of BDs to perform to monitor for control channel information (e.g., DCI) in a cross-carrier scheduling scenario, and in particular for cross-carrier scheduling scenarios in which a scheduled cell can be scheduled by a UE using more than one scheduling cell. In particular, the present disclosure provides a framework for determining the number of BDs within a monitoring period of a DCI monitoring procedure based on an SCS associated with one of the scheduling cells.

Figure 7:
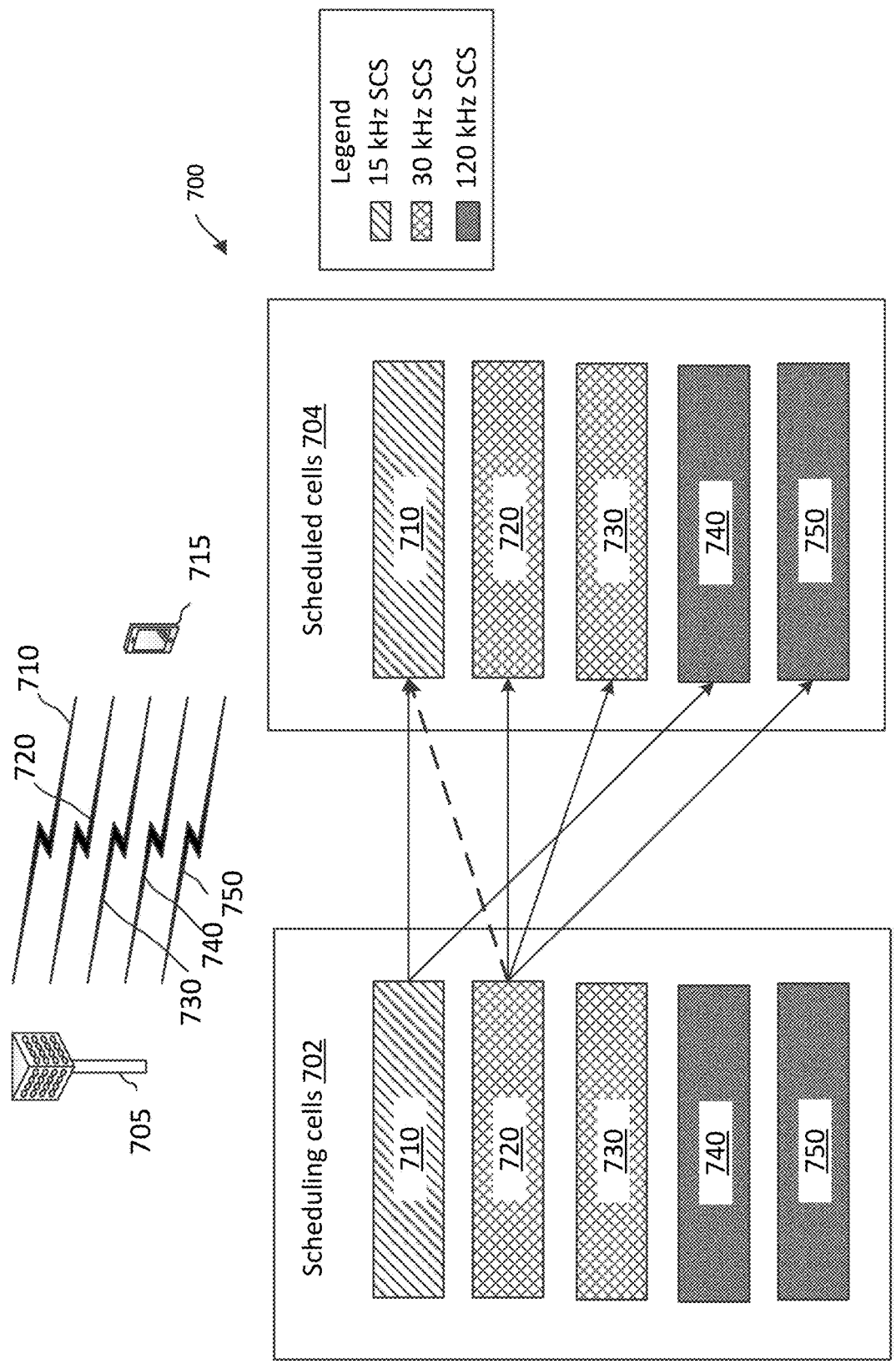
FIG. 7 illustrates a cross-carrier scheduling scheme according to some aspects of the present disclosure.

FIG. 7 illustrates a cross-carrier scheduling scheme 700 according to aspects of the present disclosure. The scheme 700 may be similar to the scheme 600 illustrated in FIG. 6, in some aspects. In this regard, the scheme 700 is employed by a UE 715, which may be one of the UEs 115, 415 in a network such as the network 100 for communications. The scheme 700 may be performed based on parameters of the search space configuration 560 indicated in the RRC information element 550 described above in FIG. 5B. A UE, such as one of the UEs 115 or 415, may be connected to a BS 705, which may be one of the BSs 105 or 405, via multiple serving cells. In the illustrated scenario of FIG. 7, the UE 715 is connected to the BS 705 via five cells: a first cell 710, a second cell 720, a third cell 730, a fourth cell 740, and a fifth cell 750. In some aspects, each cell may be associated with a carrier indicator field (CIF) value, which may range from CIF=0 to CIF=4, in this scenario. For example, the first cell 710 may be a Pcell, and may have a CIF of 0. The second cell 720 may be a first Scell, and may have a CIF of 1. The third cell 730 may be a second Scell, and may have a CIF of 2.

As explained further below, the scheme 700 of FIG. 7 may be different from the scheme 600 shown in FIG. 6, in some aspects. For example, the scheme 700 of FIG. 7 may be representative of a DSS scheme or other cross-carrier scheme in which one or more of the scheduled cells 704 can be scheduled by more than one scheduling cell 702. Further, one or more of the scheduled cells 704 may be scheduled by any of a plurality of scheduling cells 702 associated with different SCSs. For example, the first cell 710 may be self-scheduled by the first cell 710, or alternatively may be scheduled by the second cell 720. In one aspect, the first cell 710 may be a Pcell, and the second cell 720 may be an Scell. The first cell 710 is associated with an SCS of 15 kHz, as shown in the legend. The second cell 720 is associated with an SCS of 30 kHz.

As explained above, the number of BDs per monitoring period (e.g., per slot) performed by the UE 715 monitoring for DCI is determined for each scheduled cell, but is based on the SCS of the scheduling cell. Accordingly, for the first cell 710, there are two possible calculations for the number of BDs. In other words, there are two possible values for μ in the relationships described above. According to aspects of the present disclosure, the UE 715 may be configured to determine the number of BDs using the same relationships described above, and based on one of the lower SCS of the scheduling cells, the higher SCS of the scheduling cells, or an SCS specifically configured by RRC signaling. For example, in one aspect, the UE 715 may determine the number of BDs based on the lower SCS of two or more scheduling cells associated with a given scheduled cell. In this regard, referring to FIG. 7, the UE 715 may determine the number of BDs for the first cell 710 based on the SCS of the first cell 710, which is the lower SCS of the two scheduling cells 710, 720. In the illustrated example of FIG. 7, the UE 615 may determine the number of BDs for scheduling the cells 710 and 740 by the cell 710 based on the 15 kHz SCS utilized by the scheduling cell 710. When applying the equations (2) and (3), the number of BDs may be evaluated to the same as equation (6) discussed above in relation to FIG. 6. Similarly, the UE 615 may determine the number of BDs for scheduling the cells 720, 730, and 750 by the cell 720 based on the 30 kHz SCS utilized by the scheduling cell 720. When applying the equations (2) and (3), the number of BDs may be evaluated to the same as equation (7) discussed above in relation to FIG. 6.

In another aspect, the UE 715 may determine the number of BDs based on the higher SCS of two or more scheduling cells associated with a given scheduled cell. As an example, the higher SCS of the scheduling cells 710 and 720 for scheduling the cells 710, 720, 740, and 740 is 30 kHz based on the cell 720. Thus, the number of BDs to be performed for DCI monitoring for each of the first cell 710, second cell 720, third cell 730, and fifth cell 750 may be determined according to equations (2) and (3) by substituting the total number of scheduled cells (which is 5) and the number of scheduled cells scheduled by the cell 620 (which is 4) per slot (e.g., 0.5 ms slot based on 30 kHz SCS) as shown below:

$$\text{Min}\{36, R \times 36 \times 4/5\}, \qquad (8)$$

where R may be 2, and thus equation (8) may be evaluated to be about 36. In other others, the UE 615 may perform a maximum of 36 BDs per slot for each of the first cell 710, second cell 720, third cell 730, and fifth cell 750.

Similarly, the scheduled cell 740 is scheduled by cell 710, which has an SCS of 15 kHz, and the number of BDs to be performed for DCI monitoring for scheduling the cell 740 may be determined according to equations (2) and (3) by substituting the total number of scheduled cells (which is 5) and the number of scheduled cells scheduled by the cell 710 (which is 1) per slot (e.g., 1 ms slot based on 15 kHz SCS) as shown below:

$$\text{Min}\{44, R \times 44 \times 1/5\}, \qquad (9)$$

where R may be 2, and thus equation (9) may be evaluated to be about 17. In other others, the UE 615 may perform a maximum of 17 BDs per slot for the cell 740.

In another aspect, the UE 715 may determine the number of BDs per slot based on an SCS explicitly configured based on RRC signaling, wherein the configured SCS corresponds to an SCS of one of the scheduling cells (e.g., first cell 710, second cell 720).

In some aspects, the SCS configuration described above may be configured by the network 100. For example, the BS 705 may be configured to transmit the DCI according to the SCS selection configuration (e.g., higher SCS/lower SCS) configured on the UE 715 for cross-carrier scheduling scenarios in which multiple scheduling cells 702 can be used for scheduling on one of the scheduled cells 704. Thus, the BS 705 may transmit the DCI on a scheduling cell 702 such that it can be detected by the UE 715 within the number of BDs calculated based on the SCS selection configuration.

Figure 8:
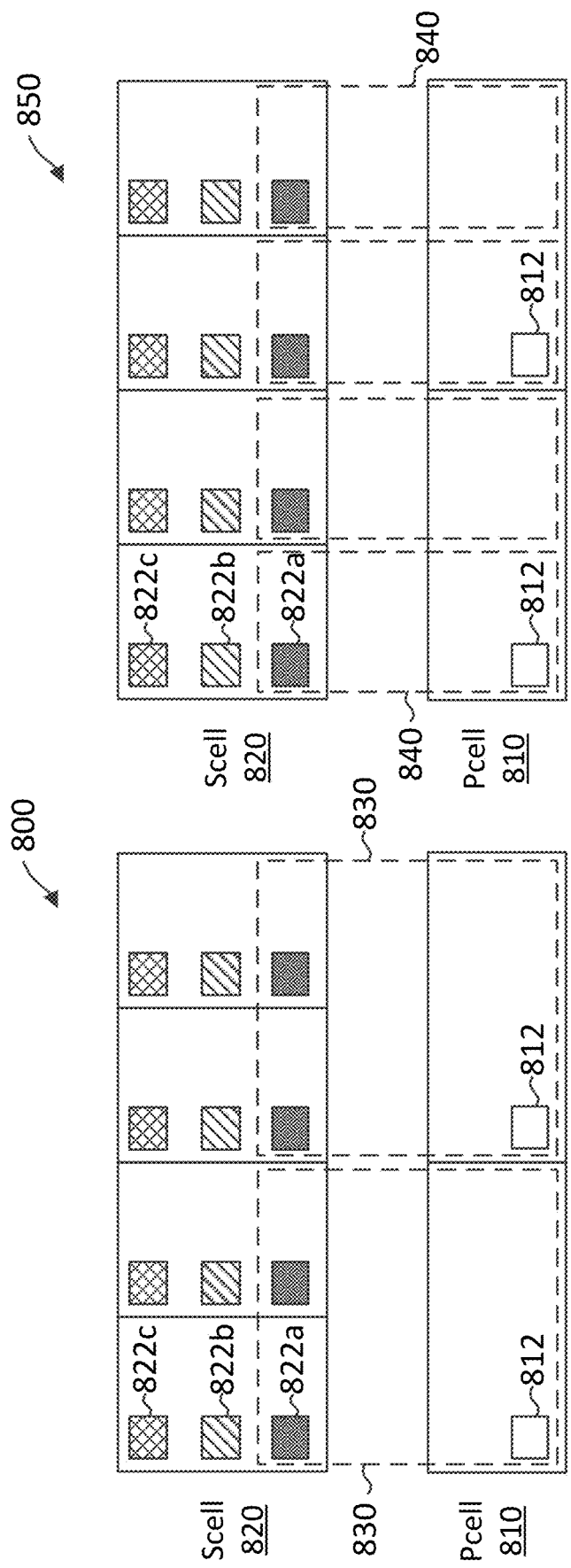
FIG. 8A illustrates a cross-carrier scheduling scheme according to some aspects of the present disclosure.
FIG. 8B illustrates a cross-carrier scheduling scheme according to some aspects of the present disclosure.

FIGS. 8A and 8B illustrate cross-carrier scheduling schemes 800, 850, respectively, according to aspects of the present disclosure. The schemes 800, 850 may be employed by UEs such as the UEs 115, 415, 615, 715 in a network such as the network 100 for communications. The schemes 800, 850 may be performed based on parameters of the search space configuration 560 indicated in the RRC information element 550 described above in FIG. 5B. A UE, such as one of the UEs 115 or 415, may be connected to a BS, such as one of the BSs 105, 405, 605, 705, via multiple serving cells. In the illustrated scenarios, the UE is connected to the BS via a Pcell 810 and an Scell 820, where either the Pcell 810 or the Scell 820 may be used to schedule DL (e.g., PDSCH) and/or UL data transmission (e.g., PUSCH) on the Pcell 810. In some aspects, search spaces 826 on the Scell 820 may be associated with DL/UL scheduling grants on the Pcell 810. In another aspect, search spaces 824 on the Scell 820 may be associated with DL/UL self-scheduling grants on the Scell 820. In another aspect, search spaces 822 on the Scell 820 may be associated with DL/UL scheduling grants on a different cell, such as an Scell.

The UE monitors for DCI in the Pcell 810 in search spaces 812, which may also be referred to as PDCCH candidates. The UE also monitors for DCI in the Scell 820 in search spaces 822, which includes PDCCH candidates 822a, 822b, and 822c. Although shown separately, it will be understood that the PDCCH candidates 822a, 822b, 822c are within the same search space 822. The PDCCH candidates 822a, 822b, 822c may correspond to different scheduled cells. For example, the PDCCH candidates 822a correspond to DCI for scheduling on the Pcell 810, and the PDCCH candidates 822b correspond to DCI for self-scheduling on the Scell 820. DCI received in either the search spaces 812, 822 may include DL/UL scheduling grants for the Pcell 810. The UE may be configured with one or more search space configurations, including a slot periodicity, a slot offset, a duration, and/or any other suitable search space configuration parameter. In one aspect, each of the search spaces 812, 822 is associated with a different search space configuration.

Referring to FIG. 8A, scheduling DL and/or UL data on the Pcell 810 may be performed by the UE by performing a number of BDs in the search spaces 812 and/or PDCCH candidates 822a of the search spaces 822. The number of BDs may be based on one of the SCSs of the scheduling cells. For example, the UE may be configured to determine the number of BDs for monitoring DCI based on the lower SCS of the two scheduling cells 810, 820. Alternatively, the UE may be configured to determine the number of BDs for monitoring DCI based on the higher SCS of the two scheduling cells 810, 820. Alternatively, the UE may be configured to determine the number of BDs for monitoring DCI based on an SCS explicitly configured by RRC signaling.

In the scheme 800 in FIG. 8A, either the SCS of the Pcell 810 is used to determine the number of BDs. In this scenario 800, the number of BDs is counted across cells that schedule DL and/or UL data for the scheduled cell. Accordingly, a first subset of BDs for PDCCH candidates in the search spaces 812 is performed by the UE in the Pcell 810, and a second subset of BDs for PDCCH candidates 822a in the search spaces 822 is performed by the UE in the Scell 820.

In that regard, for scheduling DL and/or UL data on the Pcell 810, the number of BDs per slot are allocated or distributed between the Pcell 810 and the Scell 820 for each Pcell slot, as shown by the boxes 830. The boxes 830 encompass the PDCCH candidates (e.g., 822*a*) the UE may search within the determined BD/CCE budget. In FIG. 8A, the number of BDs and/or non-overlapping CCEs is counted for each Pcell slot, which may be longer in duration than an Scell slot. For example, in one aspect, the Pcell 810 has an SCS of 15 kHz, and a slot length of 1.0 ms, and the Scell 820 has an SCS of 30 kHz and a slot length of 0.5 ms. Accordingly, the number of BDs and/or CCEs is counted across a single slot of the Pcell 810, but two slots of the Scell 820. In other words, the number of BDs is determined per slot based on a slot duration of the scheduled cell.

Referring to FIG. 7, in one aspect, the BDs in the subset associated with the first cell (Pcell 710) is determined such that the number of BDs in each scheduling cell is proportional to each scheduling cell's SCS configuration or inversely proportional to the slot length. In some aspects, the number of BDs may be determined based on a ratio of the number of slots in a monitoring period or subframe for the scheduling cell to the sum of the number of slots in the monitoring period for all of the scheduling cells. For example, the number of BDs in a given subset associated with a given scheduling cell X ($N_{SubX}$) may be based on the following relationship:

$$N_{SubX} = N_{BD} \times \frac{N_{Slots,X}}{(N_{Slots,X} + N_{Slots,Y})} \quad (10)$$

Where $N_{BD}$ is the total number of BDs determined counted across scheduling cells, $N_{Slots,X}$ is the number of slots per subframe (1 ms) of the scheduling cell X's SCS configuration, and $N_{Slots,Y}$ is the number of slots per subframe (1 ms) of the scheduling cell Y's SCS configuration. For example, a Pcell 710 having an SCS of 15 kHz may have 1 slot per subframe (1 ms), and an Scell 720 having an SCS of 30 kHz may have 2 slots per subframe (1 ms). Accordingly, if 35 total BDs are counted across a Pcell 710 having an SCS of 15 kHz and an Scell 720 having an SCS of 30 kHz, the number of BDs allocated for the Pcell 710 may be 35×(1/(1+2)), and the number of BDs allocated for the Pcell 810 may be 35×(2/(1+2)).

Referring again to FIG. 7, in one aspect, the BDs in the subset associated with the first cell (Pcell 710) is $N_p$ and the BDs in the subset associated with the second cell (Scell 720) is $N_{BD}$-$N_p$, where $N_p$ is the maximum number of BDs the UE is required to monitor in one slot, among all the slots of the first cell (Pcell 710).

Referring to FIG. 7, in one aspect, the BDs in the subset associated with the first cell (Pcell 710) and/or the BDs in the subset associated with the second cell (Scell 720) is configured as part of RRC configuration, where the total number of BDs associated with the first cell (Pcell 710) and the second cell (Scell 720) is not more than $N_{BD}$.

In contrast to the scheme 800 shown in FIG. 8A, the scheme 850 shown in FIG. 8B counts the number of BDs based on the Scell's slot length and SCS. Accordingly, the number of BDs are counted between the Pcell 810 and the Scell 820 as shown by the boxes 840, where each box 840 spans one Scell 820 slot. Similar to the scheme 800 shown in FIG. 8A, a first subset of BDs for the PDCCH candidates of the search spaces 812 is performed by the UE on the Pcell 810, and a second subset of BDs for the PDCCH candidates 822*a* of the search spaces 822 is performed by the UE on the Scell 820.

In some aspects, the network 100, via the BS 105, may configure the UEs 115 such that the UEs 115 are not required to perform more BDs than the BD/CCE limits described above with respect to FIGS. 6 and 7. However, in some aspects, the number of BDs or PDCCH candidates associated with a search space set may exceed the limit for BDs and/or PDCCH candidate for a given slot. For example, for PDCCH candidates associated with scheduling DL and/or UL data on a Pcell or P(S) cell, as shown in FIGS. 8A and 8B, it is possible that the number of PDCCH candidates counted across cells within a given slot exceeds the BD limits determined based on the SCS of the scheduling cell. Accordingly, the UE may be configured to drop or prune one or more PDCCH candidates from a search space set so that the number of BDs performed by the UE does not exceed the limits provided above (e.g., equations (2)-(5)). The present disclosure provides mechanisms for dropping or pruning PDCCH candidates based on search space configuration parameters. Dropping or pruning PDCCH candidates may refer to a UE skipping monitoring for those PDCCH candidates. In other words, the UE does not perform BD the dropped PDCCH candidates.

Figure 9:
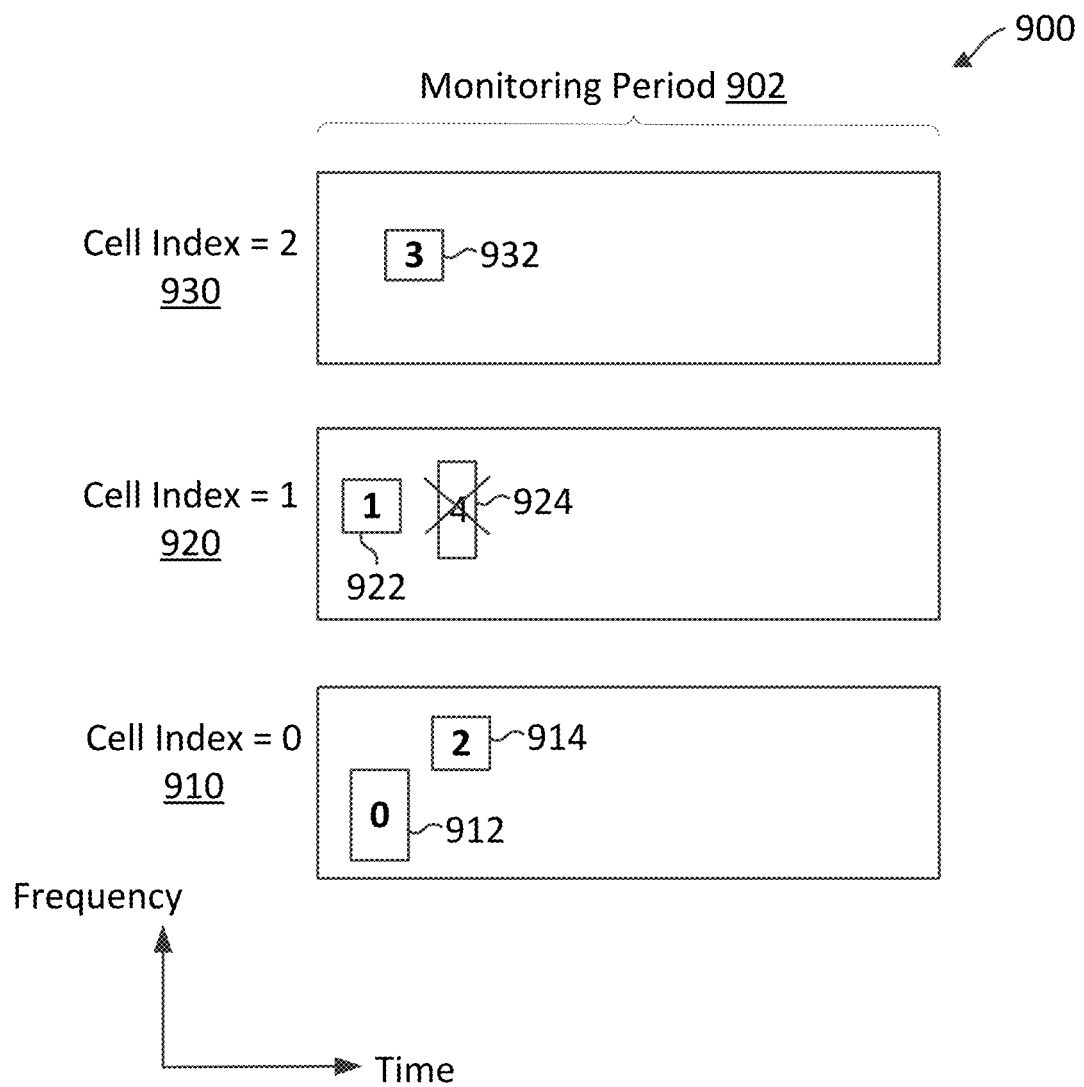
FIG. 9 illustrates a control channel information monitoring scheme according to some aspects of the present disclosure.
Figure 10:
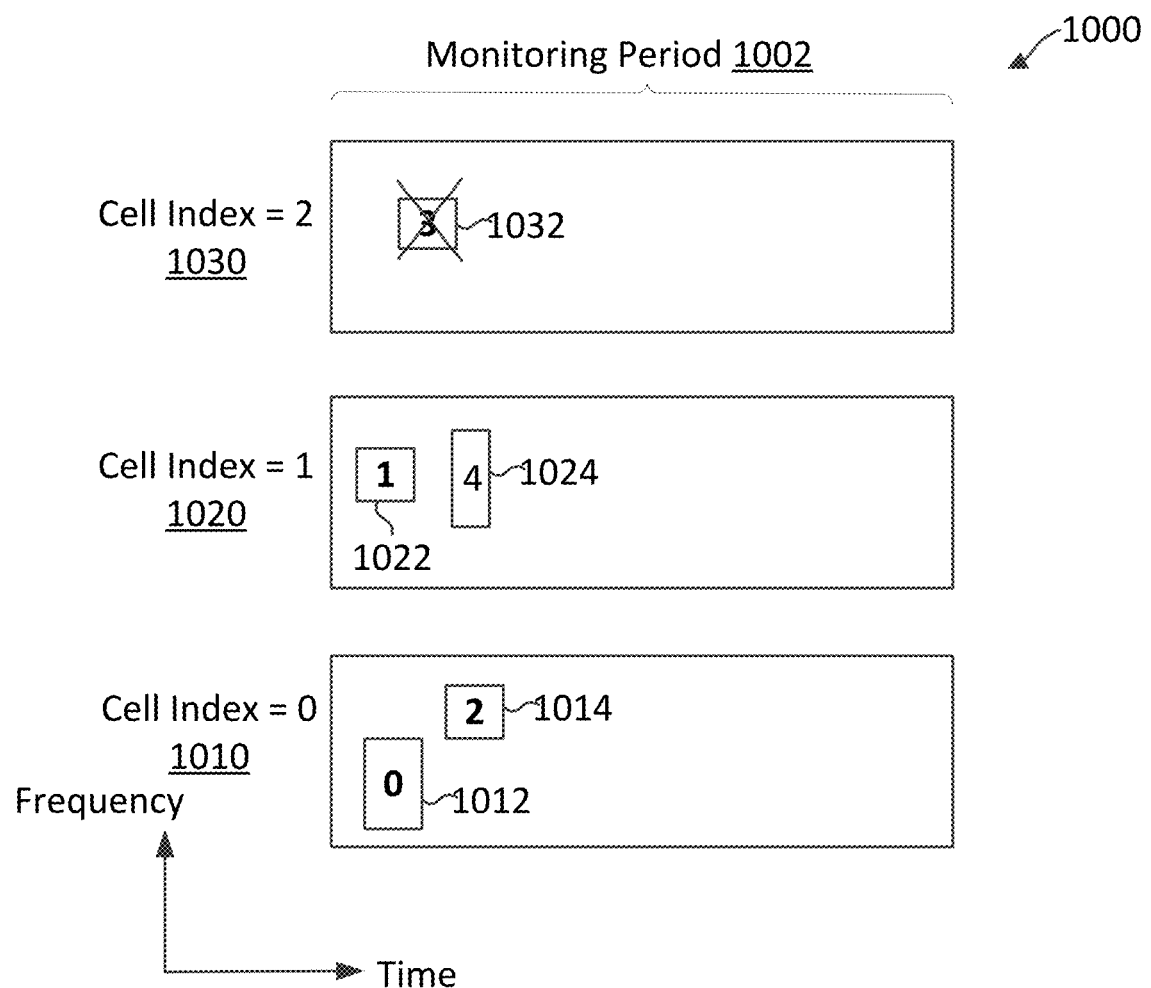
FIG. 10 illustrates a control channel information monitoring scheme according to some aspects of the present disclosure.

FIGS. 9 and 10 illustrate control channel information monitoring schemes 900, 1000, respectively, according to aspects of the present disclosure. The schemes 900, 100 may be employed by UEs such as the UEs 115, 415 in a network such as the network 100 in a CA communication scenario. The schemes 900, 100 may be performed based on parameters of the search space configuration 560 indicated in the RRC information element 550 described above in FIG. 5B. A UE, such as one of the UEs 115, 415, 615, 715, may be connected to a BS, such as one of the BSs 105, 405, 605, 705, via multiple serving cells. In the scheme 900 of FIG. 9, the UE is connected to the BS via a first cell 910 having a cell index of 0, a second cell 920 having a cell index of 1, and a third cell 930 having a cell index of 2. The cell indices may be carrier indicator field (CIF) values. In one aspect, the first cell 910 may be a Pcell, and the second cell 920 and third cell 930 may be Scells. FIG. 9 shows a plurality of search spaces or PDCCH candidates associated with the cells, where each search space is associated with a search space identifier value. It will be understood that each of the search spaces can be associated with a search space configuration, such as the configuration 560 shown in FIG. 5B. The search space identifier values may be indicated in a field of the search space configuration. For example, a first search space 912 and a second search space 914 are monitored by the UE in the first cell 910. The first search space 912 has a search space identifier of 0, and the second search space 914 has a search space identifier of 2. Further, third and fourth search spaces 922, 924 are monitored by the UE in the second cell 920. The third search space 922 has a search spacer identifier of 1, and the fourth search space 924 has a cell identifier of 4. A fifth search space 926 is monitored by the UE in the third cell. The fifth search space 932 has a cell identifier of 3.

In the scheme 900 of FIG. 9, the UE is configured to drop search spaces based on the associated search space identifier values. In particular, the UE is configured to drop search spaces starting with higher search space identifier values until the number of remaining search spaces is within the BD limits the UE is configured to perform in the monitoring period 902 (e.g., a 1 ms or 0.5 ms slot depending on the SCS). In FIG. 9, the UE is configured to drop the fourth search space 924, which has the highest search space identifier value of 4. The remaining search spaces 912, 914, 922, and 932 fall within the BD budget of the UE, which is four in this scenario. However, it will be understood that the scheme 900 shown in FIG. 9 is exemplary and that the UE may be configured to drop or retain more search spaces than what is specifically shown. In some aspects, a lower-index search space (e.g., search index 0 is for a common search space) may carry more scheduling/DCI for more essential information (e.g., system information), and thus the UE may drop search space from a highest search space index to a lower index. In some other aspects, the UE may drop search space in reverse order, for example, from a lowest search space index to a highest search space index.

In the scheme 1000 of FIG. 10, the UE is connected to the BS via a first cell 1010 having a cell index of 0, a second cell 1020 having a cell index of 1, and a third cell 1030 having a cell index of 2. The cell indices may be carrier indicator field (CIF) values. In one aspect, the first cell 1010 may be a Pcell, and the second cell 1020 and third cell 1030 may be Scells. FIG. 10 shows a plurality of search spaces or PDCCH candidates associated with the cells, where each search space is associated with a search space identifier value. It will be understood that each of the search spaces can be associated with a search space configuration, such as the configuration 560 shown in FIG. 5B. The search space identifier values may be indicated in a field of the search space configuration. For example, a first search space 1012 and a second search space 1014 are performed by the UE in the first cell 1010. The first search space has a search space identifier of 0, and the second search space 1014 has a search space identifier of 2. Further, third and fourth search spaces 1022, 1024 are performed in the second cell 1020. The third search space 1022 has a search spacer identifier of 1, and the fourth search space 1024 has a cell identifier of 4. A fifth search space 1032 is performed in the third cell. The fifth search space 1032 has a cell identifier of 3. Each search space may be associated with a search space configuration, such as the configuration 560 illustrated above in FIG. 5B.

In the scheme 1000 shown in FIG. 10, the UE is configured to drop search spaces based on the cell indices associated with each search space. In particular, the UE is configured to drop search spaces associated with the higher cell indices until the remaining number of search spaces is within the number of BD and/or PDCCH candidate limits determined for the monitoring period 1002 (e.g., a 1 ms or 0.5 ms slot depending on the SCS). Accordingly, the UE is configured to drop the fifth search space 1032, which is associated with the highest cell index value of 2. The remaining search spaces 1012, 1014, 1022, and 1024 fall within the BD and/or CCE budget determined by the UE. Thus, the UE monitors for DCI in the remaining search spaces 1012, 1014, 1022. However, it will be understood that the scheme 1000 shown in FIG. 10 is exemplary and that the UE may be configured to drop or retain more search spaces than what is specifically shown. In some aspects, the UE may drop search spaces based on the cell index, followed by the search space index. For example, if the number of BDS still exceed the limit after dropping the search space 1032, the UE may drop the search space 1024 based on the search space 1024 being within the cell 1020 of a next highest cell index and the search space 1024 being a search space with the highest search space index in the cell 1020.

Figure 11:
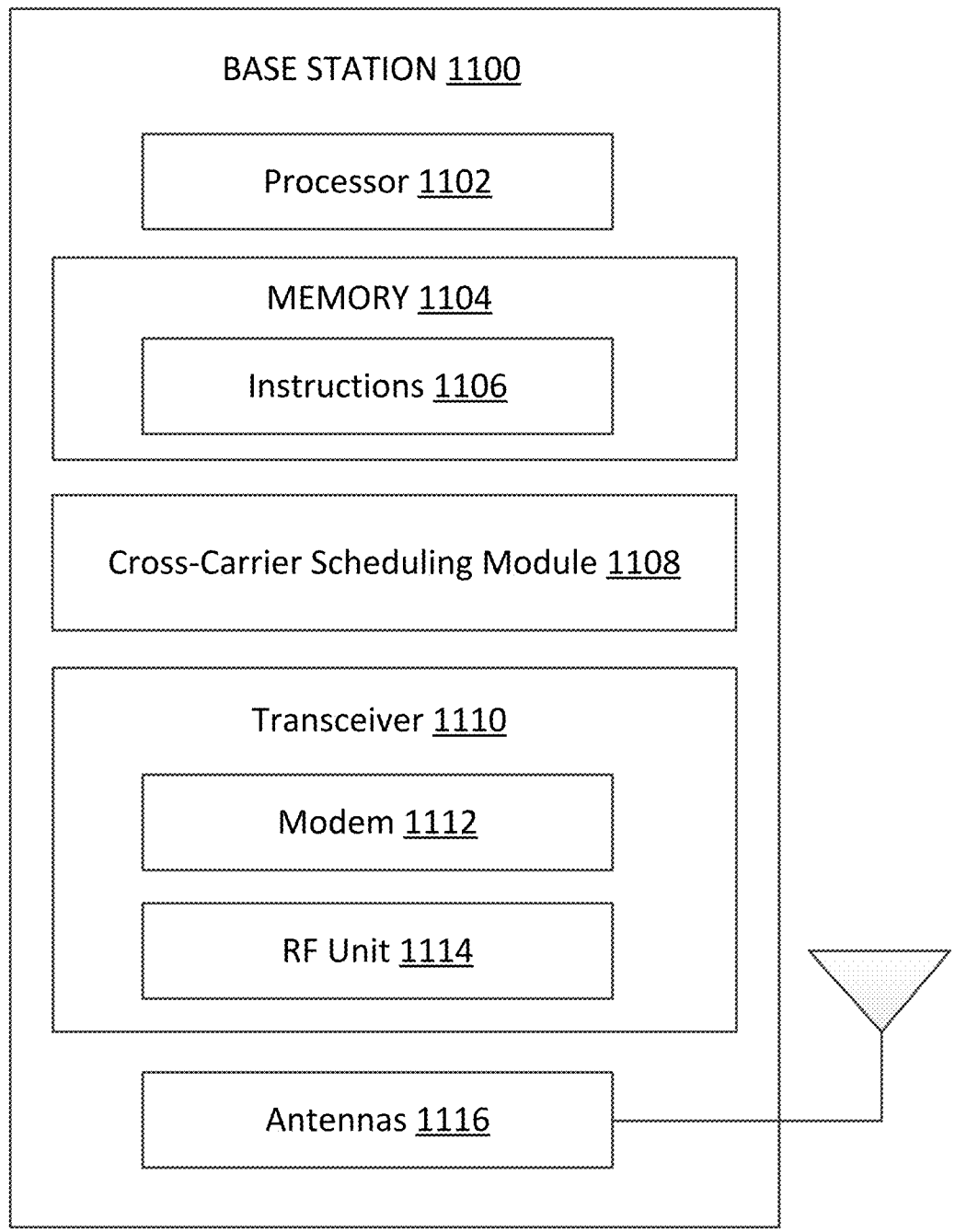
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. A shown, the BS 1100 may include a processor 1102, a memory 1104, a cross-carrier scheduling module 1108, a transceiver 1110 including a modem subsystem 1112 and an Rf unit 1114, and one or more antennas 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 3-7, 10, and 12. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The cross-carrier scheduling module 1108 may be implemented via hardware, software, or combinations thereof. For example, the cross-carrier scheduling module 1108 may be implemented as a processor, circuit, and/or instructions 1106 stored in the memory 1104 and executed by the processor 1102. In some examples, the cross-carrier scheduling module 1108 can be integrated within the modem subsystem 1112. For example, the cross-carrier scheduling module 1108 can be implemented by a combination of software components (e.g., executed by a DSP or a general processor) and hardware components (e.g., logic gates and circuitry) within the modem subsystem 1112.

The cross-carrier scheduling module 1108 may be used for various aspects of the present disclosure, for example, aspects of FIGS. 3-10 and/or 13. In one aspect, the cross-carrier scheduling module 1108 is configured to transmit, to a UE, such as one of the UEs 115, 415, 615, 715, 1200, a first configuration for scheduling in a first cell, wherein the first configuration is associated with a first search space in the first cell, and wherein the first cell is associated with a first SCS. In another aspect, the cross-carrier scheduling module 1108 is configured to transmit, to the UE, a second configuration for scheduling in the first cell, wherein the second configuration is associated with a second search space in a second cell different from the first cell, and wherein the second cell is associated with a second SCS different from the first SCS. In another aspect, the cross-carrier scheduling module 1108 is configured to transmit, to the UE, a third configuration indicating a third SCS associated with a number of DCI BDs in the first search space and the second search space, wherein the third SCS corresponds to one of the first SCS or the second SCS. In another aspect, the cross-carrier scheduling module 1108 is configured to transmit, to the UE, DCI in at least one of the first search space or the second search space.

As shown, the transceiver 1110 may include the modem subsystem 1112 and the Rf unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The Rf unit 1114 may be configured to process (e.g., perform analog to digital conversion or digital to analog conversion, etc.) modulated/encoded data (e.g., PDCCH, PDSCH, SSBs, SIBs, initial BWP configurations, PDCCH common configurations, search space configurations) from the modem subsystem 1112 (on outbound transmissions) or of transmissions originating from another source such as a UE 115. The Rf unit 1114 may be further configured to perform analog beamforming in conjunction with the digital beamforming. Although shown as integrated together in transceiver 1110, the modem subsystem 1112 and/or the Rf unit 1114 may be separate devices that are coupled together at the BS 105 to enable the BS 105 to communicate with other devices.

The Rf unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data (e.g., UE capability reports, MSG1, MSG3, ACK/NACK, PUCCH, PUSCH) to the cross-carrier scheduling module 1108 for processing. The antennas 1116 may include multiple antennas of similar or different designs in order to sustain multiple transmission links.

In some aspects, the processor 1102 is configured to coordinate with the cross-carrier scheduling module 1108 to transmit, to a UE on a scheduling cell having a first SCS, a search space configuration associated with a second SCS of a scheduled cell, and to transmit a DCI to the UE on the scheduling cell.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
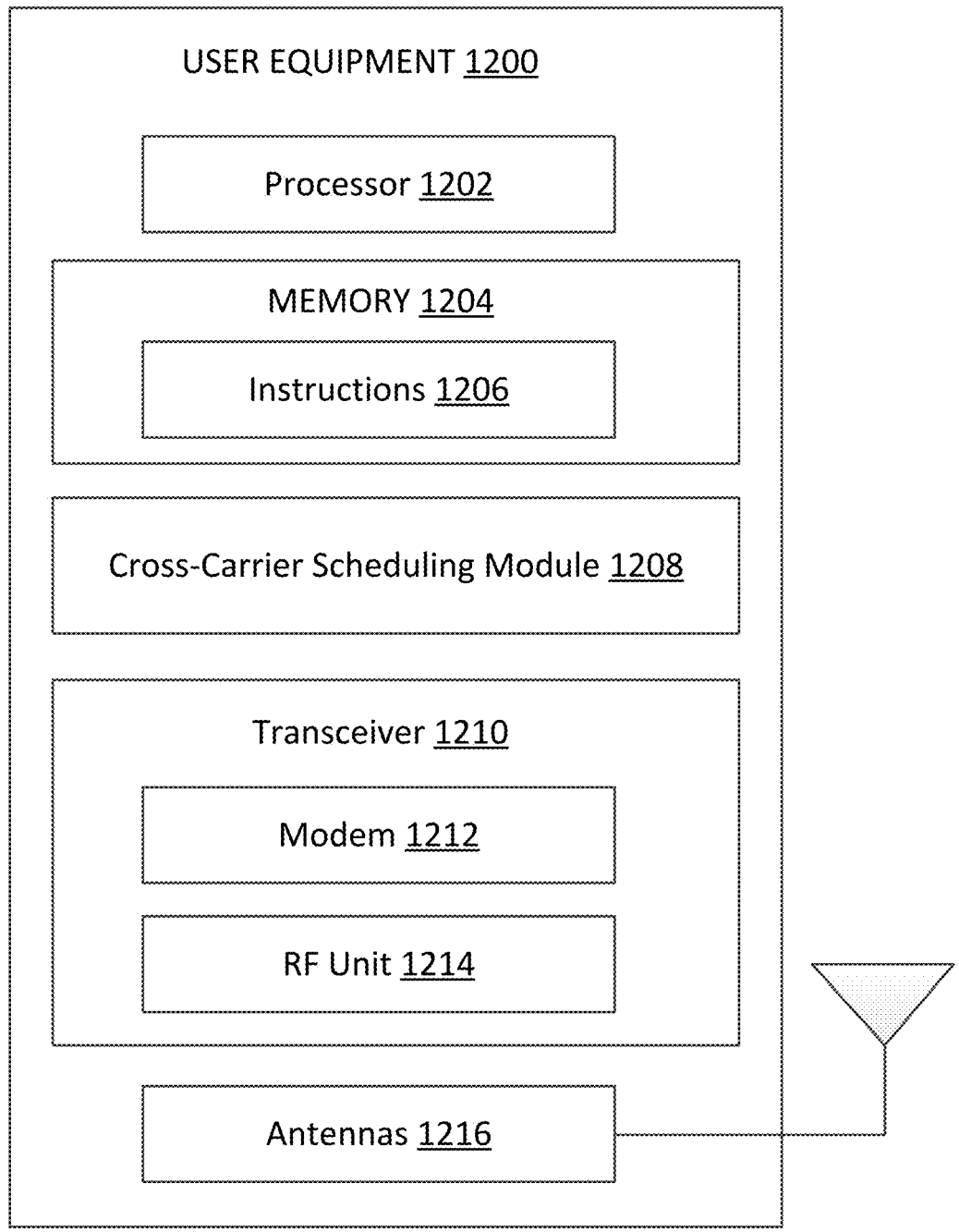
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1. As shown, the UE 1200 may include a processor 1202, a memory 1204, a cross-carrier scheduling module 1208, a transceiver 1210 including a modem subsystem 1212 and a radio frequency (RF) unit 1214, and one or more antennas 1216. These elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 in connection with aspects of the present disclosure, for example, aspects of FIGS. 3-7, 10, and 11. Instructions 1206 may also be referred to as program code, which may be interpreted broadly to include any type of computer-readable statement(s) as discussed above with respect to FIG. 8.

The cross-carrier scheduling module 1208 may be implemented via hardware, software, or combinations thereof. For example, the cross-carrier scheduling module 1208 may be implemented as a processor, circuit, and/or instructions 1206 stored in the memory 1204 and executed by the processor 1202. In some examples, the cross-carrier scheduling module 1208 can be integrated within the modem subsystem 1212. For example, the cross-carrier scheduling module 1208 can be implemented by a combination of software components (e.g., executed by a DSP or a general processor) and hardware components (e.g., logic gates and circuitry) within the modem subsystem 1212.

The cross-carrier scheduling module 1208 may be used for various aspects of the present disclosure, for example, aspects of FIGS. 3-10, and 13. In one aspect, the cross-carrier scheduling module 1208 is configured to receive, from a BS, such as one of the BSs 105, 405, 1100, a first configuration for scheduling in a first cell, wherein the first configuration is associated with a first search space in the first cell, and wherein the first cell is associated with a first SCS. The cross-carrier scheduling module 1208 is further configured to receive, from the BS, a second configuration for scheduling in the first cell, wherein the second configuration is associated with a second search space in a second cell different form the first cell, and wherein the second cell is associated with a second SCS different from the first SCS. The cross-carrier scheduling module 1208 is further configured to determine a number of BDs based on at least one of the first SCS or the second SCS, and monitor, based on the number of BDs, for DCI in the first search space and the second search space.

As shown, the transceiver 1210 may include the modem subsystem 1212 and the Rf unit 1214. The transceiver 1210 can be configured to communicate bi-directionally with other devices, such as the BSs 105. The modem subsystem 1212 may be configured to modulate and/or encode the data from the memory 1204 and/or the cross-carrier scheduling module 1208 according to a modulation and coding scheme (MCS), e.g., a low-density parity check (LDPC) coding scheme, a turbo coding scheme, a convolutional coding scheme, a digital beamforming scheme, etc. The Rf unit 1214 may be configured to process (e.g., perform analog to digital conversion or digital to analog conversion, etc.) modulated/encoded data (e.g., UE capability report, MSG1, MSG3, ACK/NACK, PUCCH) from the modem subsystem 1212 (on outbound transmissions) or of transmissions originating from another source such as a UE 115 or a BS 105. The Rf unit 1214 may be further configured to perform analog beamforming in conjunction with the digital beamforming. Although shown as integrated together in transceiver 1210, the modem subsystem 1212 and the Rf unit 1214 may be separate devices that are coupled together at the UE 115 to enable the UE 115 to communicate with other devices.

The Rf unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., PDCCH, PDSCH, RRC configuration, SSB, SIB, PDCCH, search space configurations) to the cross-carrier scheduling module 1208 for processing. The antennas 1216 may include multiple antennas of similar or different designs in order to sustain multiple transmission links. The Rf unit 1214 may configure the antennas 1216.

In some aspects, the processor 1202 is configured to coordinate with the cross-carrier scheduling module 1208 to perform DCI monitoring in a scheduling cell having a first SCS using a search space configuration associated with a second SCS of a scheduled cell.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
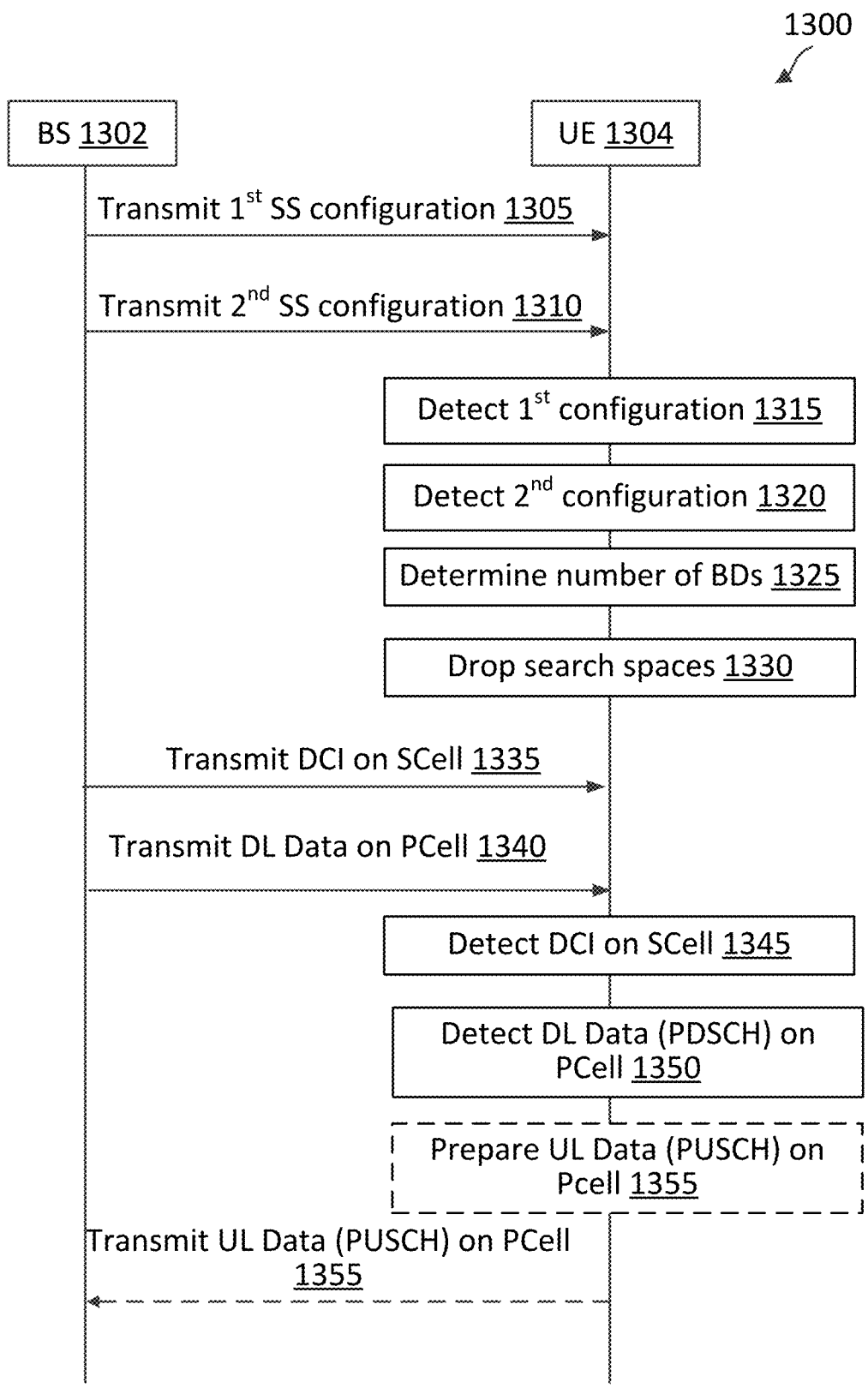
FIG. 13 is a signaling diagram illustrating cross-carrier scheduling method according to some aspects of the present disclosure.

FIG. 13 is a signaling diagram illustrating a cross-carrier scheduling method 1300 according to some aspects of the present disclosure. The method 1300 may be implemented between a BS 1302, a UE 1304. The BS 1302 may correspond to a BS 105, 405, or 1100, and the UE may correspond to a UE 115, 415, or 1200. In some instances, the UE 1304 may be configured for carrier aggregation (CA) and cross-carrier scheduling between multiple serving cells, including a Pcell and at least one Scell. The method 1300 may be implemented in conjunction with the schemes 300, 400, 500, 600, 700, 800, 850, 900, 1000, and/or 1300 discussed with reference to FIGS. 3-10 and 13, respectively. As illustrated, the method 1300 includes a number of enumerated actions, but embodiments of the method 1300 may include additional actions before, after, and in between the enumerated actions. In some embodiments, one or more of the enumerated actions may be omitted or performed in a different order.

At a high level, to monitor for DCI on different cells associated with different SCSs, the UE 1304 may determine a number of BDs and/or CCEs, based on the SCS of one of the scheduling cells. For example, when DL/UL data transmissions on a scheduled cell can be scheduled by more than one scheduling cell, the UE may determine the number of BDs and/or CCEs based on the higher or lower SCS of the scheduling cells. In another aspect, the UE may determine the number of BDs and/or CCEs based on an SCS explicitly configured by RRC signaling. The BDs and/or CCEs may be counted across the scheduling cells, as the DCI may be transmitted on any of the scheduling cells for a given scheduled cell. The BS may transmit DCI according to this framework such that the UE is able to detect the DCI within the BD and/or CCE limits determined by the UE.

At action 1305, the BS 1302 transmits a first search space configuration to the UE. In some aspects, the first search space configuration may be used for scheduling on a first cell, which may be a Pcell, and may be transmitted to the UE via the first cell or a second cell, which may be an Scell. For instance, the first search space configuration may be used by the UE 1304 to monitor for DCI in a search space within the second cell, where the search space of the second cell is used for scheduling data transmissions on the first cell. The first search space configuration may include or indicate a plurality of parameters for monitoring DCI. For example, the first search space configuration may indicate a slot periodicity and offset, a duration, a staring symbol, or any other suitable parameter. Further, the first search space configuration may indicate a search space identifier value and a cell index (e.g., CIF) on which the search space is performed. The first search space configuration may include one or more of the parameters in the search space configuration 560. The first search space configuration may be included in an RRC information element or message. In one aspect, the first search space configuration may be a UE-specific search space configuration used for monitoring for DCI in the search space of the Scell, where the DCI in the search space indicates scheduling information for scheduling DL and/or UL data on the Pcell. The first search space configuration may be based on or associated with an SCS of the cell on which the search space is used. For example, the Pcell may have a first SCS, and the Scell may have a second SCS higher than the first SCS. In one aspect, the first SCS may be 15 kHz, and the second SCS may be 30 kHz, 120 kHz, or any other suitable SCS value. In some instances, the BS 1302 may utilize one or more components, such as the processor 1102, the memory 1104, the cross-carrier scheduling module 1108, the transceiver 1110, the modem 1112, and the one or more antennas 1116, to perform aspects of action 1305.

At action 1310, the BS 1302 transmits a second search space configuration to the UE. In some aspects, the second search space configuration may be used for scheduling on the second cell, and may be transmitted via the first cell or the second cell. For instance, the second search space configuration may be used by the UE 1304 to monitor for DCI in a search space within the second cell, where the search space is used for scheduling data transmission on the second cell. The second search space configuration may include or indicate a plurality of parameters for monitoring DCI. The second search space configuration may indicate a slot periodicity and offset, a duration, a staring symbol, or any other suitable parameter. For example, the second search space configuration may include one or more of the parameters in the search space configuration 560. The second search space configuration may be included in an RRC information element or message. Further, the second search space configuration may indicate a search space identifier value and a cell index (e.g., CIF) on which the search space is performed. The second search space configuration may be based on or associated with the SCS of the cell on which the search space is used. In one aspect, the second search space configuration may be a UE-specific search space configuration used for monitoring for DCI on an Scell having a second SCS. In some instances, the BS 1302 may utilize one or more components, such as the processor 1102, the memory 1104, the cross-carrier scheduling module 1108, the transceiver 1110, the modem 1112, and the one or more antennas 1116, to perform aspects of action 1310.

In some aspects, the first search space configuration may indicate a search space index 1 referencing the search space in the second cell. The second search space configuration may also indicate a search space index 1 referencing the same search space in the second cell. However, the first search space configuration and the second search space configuration can have different monitoring periodicity parameters and/or different monitoring slot offset parameters as discussed above with respect to FIG. 7.

At action 1315, the UE 1304 detects the first search space configuration. The first search space configuration may be detected on the Pcell or the Scell, in some aspects. Detecting the first search space configuration may include receiving and decoding an RRC information element. The first search space configuration may be associated with an SCS of the Pcell, which may be the scheduled cell in the cross-carrier scheduling scenario. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1315.

At action 1320, the UE 1304 detects the second search space configuration. The second search space configuration may be detected on the Pcell or the Scell, in some aspects. Detecting the second search space configuration may include receiving and decoding an RRC information element. The second search space configuration may be associated with an SCS of the Scell, which may be the scheduling cell in the cross-carrier scheduling scenario. In some aspects, the SCS of the Scell may be different from an SCS of the Pcell. For example, the SCS of the Scell may be greater than the SCS of the Pcell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1320.

At action 1325, the UE 1304 determines a maximum number of BDs (PDCCH candidates) per monitoring period to monitor for DCI. As explained above, in some aspects, more than one cell may be used to schedule DL/UL transmissions on a scheduled cell. Thus, monitoring for DCI to schedule data transmissions on a scheduled cell may include using search spaces or PDCCH candidates counted across multiple scheduling cells. Further, the scheduling cells may have different SCS. Because the number of BDs performed within a monitoring period is based on an SCS, the UE determines the number of BDs based on an SCS associated with at least one of the scheduling cells. For example, the UE may determine the number of BDs using equations (2) and (3), and based on the lower SCS of the scheduling cells. For example, if both the Pcell and the Scell can be used to schedule DL/UL transmissions on the Pcell, the UE may determine the number of BDs based on the SCS of the Pcell, which has a lower SCS than the Scell. In another aspect, the UE may determine the number of BDs based on the higher SCS of the scheduling cells. For example, if both the Pcell and the Scell can be used to schedule DL/UL transmission on the Pcell, the UE may determine the number of BDs based on the SCS of the Scell, which has a higher SCS than the Pcell.

Because DCI may be transmitted by the BS 1302 on either of the scheduling cells, the number of BDs determined in action 1325 may be counted across the scheduling cells as illustrated above in FIGS. 8A and 8B. The number of BDs may be determined for each monitoring period, which may be a slot. In one aspect, the monitoring period may be based on the slot length of one of the scheduling cells. For example, if the SCS of the scheduling Scell is used to determine the number of BDs in action 1325, the number of BDs may be counted for the slot length of the scheduling Scell. Alternatively, if the SCS of the scheduling Pcell is used to determine the number of BDs in action 1325, the number of BDs may be counted for the slot length of the scheduling Pcell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1320.

In action 1330, the UE 1304 drops or prunes search spaces or PDCCH candidates within each monitoring period that exceed the BD limit determined in action 1325. The UE may drop search spaces based on a search space identifier value associated with each search space and/or a cell index (e.g., CIF) associated with each search space, as illustrated above in FIGS. 9 and 10. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1330.

At action 1335, the BS 1302 transmits DCI via the Scell. In some aspects, the DCI may include first DCI transmitted in search space within the Scell according to the first search space configuration, and second DCI transmitted in the search space within the Scell according to the second search space configuration. The DCI may include scheduling information for DL and/or UL data on the Pcell and/or Scell. For example, the first DCI may indicate the location of DL data in a PDSCH on the Pcell, or may include a UL grant for UL data in a PUSCH on the Pcell. Further, the second DCI may indicate the location of DL data in a PDSCH on the Scell. The DCI may be transmitted by the BS 1302 according to the framework used by the UE 1304 to determine the BD and/or CCE limits described above such that the UE can successfully detect the DCI within the BD and/or CCE limits. In some instances, the BS 1302 may utilize one or more components, such as the processor 1102, the memory 1104, the cross-carrier scheduling module 1108, the transceiver 1110, the modem 1112, and the one or more antennas 1116, to perform aspects of action 1335.

At action 1340, the BS 1302 transmits DL data in a PDSCH via the Pcell. The DL data is transmitted according to the scheduling information provided in the DCI (the first DCI) associated with the Pcell and transmitted to the UE 1304 in search space of the Scell according to the first search space configuration. In some instances, the BS 1302 may utilize one or more components, such as the processor 1102, the memory 1104, the cross-carrier scheduling module 1108, the transceiver 1110, the modem 1112, and the one or more antennas 1116, to perform aspects of action 1035.

At action 1345, the UE 1004 detects the DCI on the Scell. Detecting the DCI may include successfully decoding the DCI based on the determined number of BDs described above with respect to action 1325. In some aspects, as explained above, detecting the DCI on the Scell may include detecting multiple DCIs in PDCCH candidates within the search space of the Scell, where each DCI (e.g., first DCI, second DCI), is associated with scheduling DL and/or UL data on a different scheduled cell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1345.

At action 1350, the UE 1304 detects the DL data transmitted in action 1340 via the PDSCH in the Pcell. The DL data may be detected according to scheduling information provided by the DCI in the search space of the Scell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1350.

In action 1355, which may be an optional or alternative action to action 1350, the UE 1304 generates and prepares UL data for transmission in a PUSCH on the Pcell according to a UL grant provided in the DCI detected in action 1345. In some aspects, the Scell, which is the scheduling cell in the illustrated scenario, may not have UL resources. Accordingly, UL transmissions may be scheduled in the Pcell, or in a different Scell other than the scheduling Scell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1355.

In action 1360, which may be an optional action, the UE 1304 transmits the UL data to the BS 1302 in a PUSCH via the Pcell. In some instances, the UE 1304 may utilize one or more components, such as the processor 1202, the memory 1204, the cross-carrier scheduling module 1208, the transceiver 1210, the modem 1212, and the one or more antennas 1216, to perform aspects of action 1360.

Figure 14:
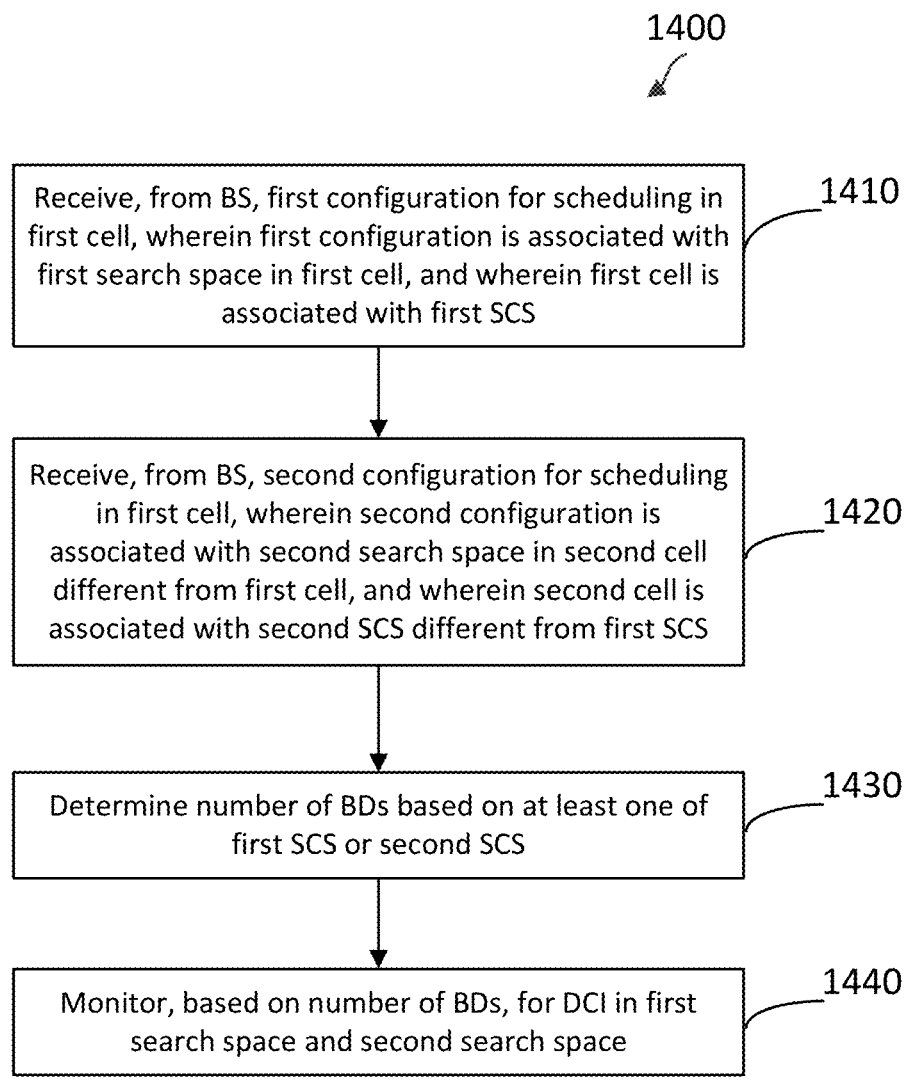
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115, 415, 1200, may utilize one or more components, such as the processor 1202, the memory 1204, the cross-carrier scheduling module 1208, the transceiver 1210, the modem 1212, and the one or more antennas 1216, to execute the steps of method 1400. The method 1400 may employ similar mechanisms as described above in FIGS. 3-10 and 13. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, the UE receives, from a BS, such as one of the BS 105, 405, 605, 705, 1100, a first configuration for scheduling in a first cell, wherein the first configuration is associated with a first search space in the first cell, and wherein the first cell is associated with a first SCS, At block 1420, the UE receives, from the BS, a second configuration for scheduling in the first cell, wherein the second configuration is associated with a second search space in a second cell different from the first cell, and wherein the second cell is associated with a second SCS different from the first SCS.

At block 1430, the UE determines a number of BDs based on at least one of the first SCS or the second SCS. In one aspect, determining the number of BDs includes selecting a lower SCS between the first SCS or the second SCS, and determining the number of BDs based on a configuration associated with the lower SCS. In one aspect, determining the number of BDs includes selecting a higher SCS between the first SCS or the second SCS, and determining the number of BDs based on a configuration associated with the higher SCS. In some aspects, the first configuration indicates a first monitoring periodicity, and the second configuration indicates a second monitoring periodicity different from the first monitoring periodicity. In some aspects, the determining the number of BDs is further based on at least one of the first monitoring periodicity, the first SCS, the second monitoring periodicity, or the first SCS.

At block 1440, the UE monitors, based on the number of BDs, for DCI in the first search space and the second search space. In one aspect, monitoring for the DCI includes performing a first subset of the BDs in the first search space, and performing a second subset of the BDs in the second search space. In one aspect, monitoring for the DCI includes determining whether a total number of DCI candidates in the first search space and the second search space exceeds the number of BDs, and excluding, in response to determining that the total number of DCI candidates exceed the number of BDs, the first search space or the second search space from the monitoring based on search space identifiers associated with the first search space and the second search space. In some aspects, at least one of the first search space comprises a first plurality of search spaces or the second search space comprises a second plurality of search spaces, and the monitoring for the DCI includes: determining a total number of DCI candidates in the at least one of the first plurality of search spaces or the second plurality of search spaces exceeds the number of BDs; excluding, in response to determining the total number of DCI candidates exceed the number of BDs, one or more search spaces from the at least one of the first plurality of search spaces or the second plurality of search spaces based on cell identifiers associated with the one or more search spaces; and excluding one or more other search spaces from the at least one of the first plurality of search spaces or the second plurality of search spaces further based on search space identifiers associated with the one or more other search spaces.

In some aspects, the method 1400 further includes receiving, from the BS, an RRC configuration indicating a third SCS, wherein the third SCS corresponds to the first SCS or the second SCS. In some aspects, determining the number of BDs at block 1430 is further based on the third SCS.

Figure 15:
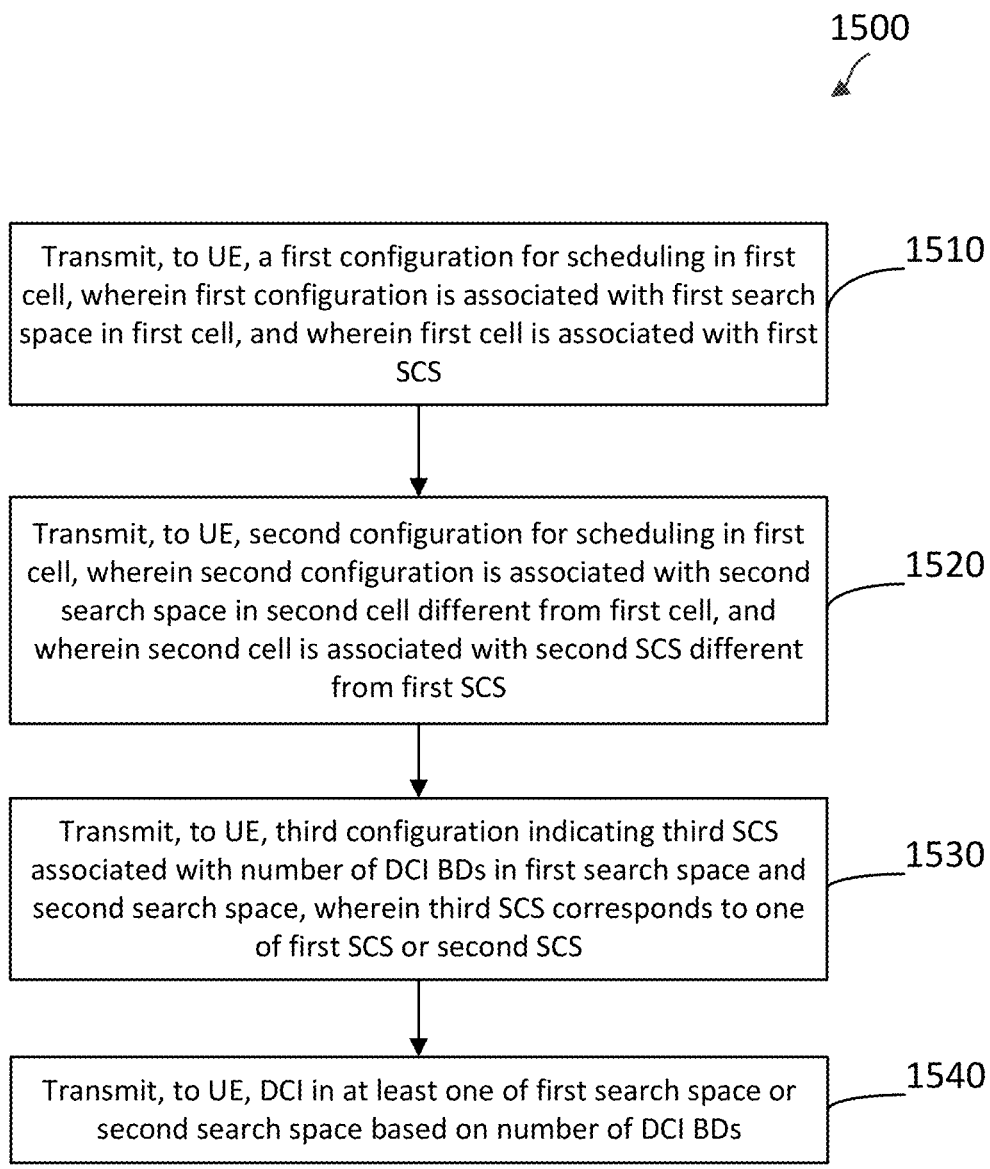
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the BSs 105, 405, 1100, may utilize one or more components, such as the processor 1102, the memory 1104, the cross-carrier scheduling module 1108, the transceiver 1110, the modem 1112, and the one or more antennas 1116, to execute the steps of method 1500. The method 1500 may employ similar mechanisms as described above in FIGS. 3-10 and 13. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, the BS transmits, to a UE, a first configuration for scheduling in a first cell, wherein the first configuration is associated with a first search space in the first cell, and wherein the first cell is associated with a first SCS.

At block 1520, the BS transmits, to the UE, a second configuration for scheduling in the first cell, wherein the second configuration is associated with a second search space in a second cell different from the first cell, and wherein the second cell is associated with a second SCS different from the first SCS.

At block 1530, the BS transmits, to the UE, a third configuration indicating a third SCS associated with a number of DCI BDs in the first search space and the second search space, wherein the third SCS corresponds to one of the first SCS or the second SCS. In one aspect, transmitting the third configuration indicating the third SCS comprises transmitting, to the UE, an RRC configuration comprising the third configuration.

At block 1540, the BS transmits, to the UE, DCI in at least one of the first search space or the second search space based on the number of DCI BDs.

In some aspects, the method 1500 further includes determining the number of DCI BDs based on the third SCS and a capability to the UE.

The present disclosure also includes the following aspects:

1. A method of wireless communication performed by a user equipment (UE), the method comprising:
    receiving, from a base station (BS), a first configuration for scheduling in a first cell, wherein the first configuration is associated with a first search space in the first cell, and wherein the first cell is associated with a first subcarrier spacing (SCS);
    receiving, from the BS, a second configuration for scheduling in the first cell, wherein the second configuration is associated with a second search space in a second cell different from the first cell, and wherein the second cell is associated with a second SCS different from the first SCS;
    determining a number of blind detections (BDs) based on at least one of the first SCS or the second SCS; and
    monitoring, based on the number of BDs, for downlink control information (DCI) in the first search space and the second search space.

2. The method of claim 1, wherein the determining the number of BDs comprises: selecting a lower SCS between the first SCS or the second SCS; and determining the number of BDs based on a configuration associated with the lower SCS.

3. The method of claim 1, wherein the determining the number of BDs comprises: selecting a higher SCS between the first SCS or the second SCS; and determining the number of BDs based on a configuration associated with the higher SCS.

4. The method of claim 1, further comprising:
    receiving, from the BS, a radio resource control (RRC) configuration indicating a third SCS, wherein the third SCS corresponds to the first SCS or the second SCS, wherein the determining the number of BDs is further based on the third SCS.

5. The method of any of claims 1-4, wherein the monitoring for the DCI comprises: performing a first subset of the BDs in the first search space; and performing a second subset of the BDs in the second search space.

6. The method of any of claims 1-5, wherein the monitoring for the DCI comprises: determining whether a total number of DCI candidates in the first search space and the second search space exceeds the number of BDs; and excluding, in response to determining that the total number of DCI candidates exceed the number of BDs, the first search space or the second search space from the monitoring based on search space identifiers associated with the first search space and the second search space.

7. The method of claim 6, wherein the at least one of the first search space comprises a first plurality of search spaces or the second search space comprises a second plurality of search spaces, and wherein the monitoring for the DCI comprises:
    determining a total number of DCI candidates in the at least one of the first plurality of search spaces or the second plurality of search spaces exceeds the number of BDs;
    excluding, in response to determining the total number of DCI candidates exceed the number of BDs, one or more search spaces from the at least one of the first plurality of search spaces or the second plurality of search spaces based on cell identifiers associated with the one or more search spaces; and
    excluding one or more other search spaces from the at least one of the first plurality of search spaces or the second plurality of search spaces further based on search space identifiers associated with the one or more other search spaces.

8. The method of any of claims 1-7, wherein the first configuration indicates a first monitoring periodicity, and wherein the second configuration indicates a second monitoring periodicity different from the first monitoring periodicity, and wherein the determining the number of BDs is further based on at least one of the first monitoring periodicity, the first SCS, the second monitoring periodicity, or the first SCS.

9. A method of wireless communication performed by a base station (BS), the method comprising:
    transmitting, to a user equipment (UE), a first configuration for scheduling in a first cell, wherein the first configuration is associated with a first search space in the first cell, and wherein the first cell is associated with a first subcarrier spacing (SCS);
    transmitting, to the UE, a second configuration for scheduling in the first cell, wherein the second configuration is associated with a second search space in a second cell different from the first cell, and wherein the second cell is associated with a second SCS different from the first SCS;
    transmitting, to the UE, a third configuration indicating a third SCS associated with a number of downlink control information (DCI) blind detections (BDs) in the first search space and the second search space, wherein the third SCS corresponds to one of the first SCS or the second SCS; and
    transmitting, to the UE, DCI in at least one of the first search space or the second search space based on the number of DCI BDs.

10. The method of claim 9, further comprising:
determining the number of DCI BDs based on the third SCS and a capability of the UE.

11. The method of any of claim 9 or 10, wherein the transmitting the third configuration indicating the third SCS comprises transmitting, to the UE, a radio resource control (RRC) configuration comprising the third configuration.

12. A user equipment (UE), comprising:
a transceiver configured to:
receive, from a base station (BS), a first configuration for scheduling in a first cell, wherein the first configuration is associated with a first search space in the first cell, and wherein the first cell is associated with a first subcarrier spacing (SCS); and
receive, from the BS, a second configuration for scheduling in the first cell, wherein the second configuration is associated with a second search space in a second cell different from the first cell, and wherein the second cell is associated with a second SCS different from the first SCS; and a processor configured to:
determine a number of blind detections (BDs) based on at least one of the first SCS or the second SCS; and
monitor, based on the number of BDs, for downlink control information (DCI) in the first search space and the second search space.

13. The UE of claim 12, wherein the processor configured to determine the number of BDs comprises the processor configured to:
select a lower SCS between the first SCS or the second SCS; and
determine the number of BDs based on a configuration associated with the lower SCS.

14. The UE of claim 12, wherein the processor configured to determine the number of BDs comprises the processor configured to:
select a higher SCS between the first SCS or the second SCS; and
determine the number of BDs based on a configuration associated with the higher SCS.

15. The UE of claim 12, wherein the transceiver is further configured to:
receive, from the BS, a radio resource control (RRC) configuration indicating a third SCS, wherein the third SCS corresponds to the first SCS or the second SCS,
wherein the processor configured to determine the number of BDs comprises the processor configured to determine the number of BDs based on the third SCS.

16. The UE of any of claims 12-15, wherein the processor configured to monitor for the DCI comprises the processor configured to:
perform a first subset of the BDs in the first search space; and
perform a second subset of the BDs in the second search space.

17. The UE of any of claims 12-16, wherein the processor configured to monitor for the DCI comprises the processor configured to:
determine whether a total number of DCI candidates in the first search space and the second search space exceeds the number of BDs; and
exclude, in response to determining that the total number of DCI candidates exceed the number of BDs, the first search space or the second search space from the monitoring based on search space identifiers associated with the first search space and the second search space.

18. The UE of claim 17, wherein the at least one of the first search space comprises a first plurality of search spaces or the second search space comprises a second plurality of search spaces, and wherein the processor configured to monitor for the DCI comprises the processor configured to:
determine a total number of DCI candidates in the at least one of the first plurality of search spaces or the second plurality of search spaces exceeds the number of BDs;
exclude, in response to determining the total number of DCI candidates exceed the number of BDs, one or more search spaces from the at least one of the first plurality of search spaces or the second plurality of search spaces based on cell identifiers associated with the one or more search spaces; and
exclude one or more other search spaces from the at least one of the first plurality of search spaces or the second plurality of search spaces further based on search space identifiers associated with the one or more other search spaces.

19. The UE of any of claims 12-18, wherein the first configuration indicates a first monitoring periodicity, and wherein the second configuration indicates a second monitoring periodicity different from the first monitoring periodicity, and wherein the processor configured to determine the number of BDs comprises the processor configured to determine the number of BDs based on at least one of the first monitoring periodicity, the first SCS, the second monitoring periodicity, or the first SCS.

20. A base station (BS), comprising:
a transceiver configured to:
transmit, to a user equipment (UE), a first configuration for scheduling in a first cell, wherein the first configuration is associated with a first search space in the first cell, and wherein the first cell is associated with a first subcarrier spacing (SCS);
transmit, to the UE, a second configuration for scheduling in the first cell, wherein the second configuration is associated with a second search space in a second cell different from the first cell, and wherein the second cell is associated with a second SCS different from the first SCS;
transmit, to the UE, a third configuration indicating a third SCS associated with a number of downlink control information (DCI) blind detections (BDs) in the first search space and the second search space, wherein the third SCS corresponds to one of the first SCS or the second SCS; and
transmit, to the UE, DCI in at least one of the first search space or the second search space based on the number of DCI BDs.

21. The BS of claim 20, further comprising a processor configured to:
determine the number of DCI BDs based on the third SCS and a capability of the UE.

22 The BS of any of claim 20 or 21, wherein the transceiver configured to transmit the third configuration indicating the third SCS comprises the transceiver configured to transmit, to the UE, a radio resource control (RRC) configuration comprising the third configuration.

23. A non-transitory computer-readable medium having program code recorded thereon, the program code comprising:
code for causing a user equipment (UE) to receive, from a base station (BS), a first configuration for scheduling in a first cell, wherein the first configuration is associated with a first search space in the first cell, and wherein the first cell is associated with a first subcarrier spacing (SCS);

code for causing the UE to receive, from the BS, a second configuration for scheduling in the first cell, wherein the second configuration is associated with a second search space in a second cell different from the first cell, and wherein the second cell is associated with a second SCS different from the first SCS;

code for causing the UE to determine a number of blind detections (BDs) based on at least one of the first SCS or the second SCS; and code for causing the UE to monitor, based on the number of BDs, for downlink control information (DCI) in the first search space and the second search space.

24. The non-transitory computer-readable medium of claim 23, wherein the code for causing the UE to determine the number of BDs comprises:
code for causing the UE to select a lower SCS between the first SCS or the second SCS; and
code for causing the UE to determine the number of BDs based on a configuration associated with the lower SCS.

25. The non-transitory computer-readable medium of claim 23, wherein the code for causing the UE to determine the number of BDs comprises:
code for causing the UE to select a higher SCS between the first SCS or the second SCS; and
code for causing the UE to determine the number of BDs based on a configuration associated with the higher SCS.

26. The non-transitory computer-readable medium of claim 23, wherein the program code further comprises:
code for causing the UE to receive, from the BS, a radio resource control (RRC) configuration indicating a third SCS, wherein the third SCS corresponds to the first SCS or the second SCS,
wherein the code for causing the UE to determine the number of BDs comprises code for causing the UE to determine the number of BDs based on the third SCS.

27. The non-transitory computer-readable medium of any of claims 23-26, wherein the code for causing the UE to monitor for the DCI comprises:
code for causing the UE to perform a first subset of the BDs in the first search space; and
code for causing the UE to perform a second subset of the BDs in the second search space.

28. The non-transitory computer-readable medium of any of claims 23-27, wherein the code for causing the UE to monitor for the DCI comprises:
code for causing the UE to determine whether a total number of DCI candidates in the first search space and the second search space exceeds the number of BDs; and
code for causing the UE to exclude, in response to determining that the total number of DCI candidates exceed the number of BDs, the first search space or the second search space from the monitoring based on search space identifiers associated with the first search space and the second search space.

29. The non-transitory computer-readable medium of claim 28, wherein the at least one of the first search space comprises a first plurality of search spaces or the second search space comprises a second plurality of search spaces, and wherein the code for causing the UE to monitor for the DCI comprises:

code for causing the UE to determine a total number of DCI candidates in the at least one of the first plurality of search spaces or the second plurality of search spaces exceeds the determined number of BDs;

code for causing the UE to exclude, in response to determining the total number of DCI candidates exceed the number of BDs, one or more search spaces from the at least one of the first plurality of search spaces or the second plurality of search spaces based on cell identifiers associated with the one or more search spaces; and code for causing the UE to exclude one or more other search spaces from the at least one of the first plurality of search spaces or the second plurality of search spaces further based on search space identifiers associated with the one or more other search spaces.

30. The non-transitory computer-readable medium of any of claims 23-29, wherein the first configuration indicates a first monitoring periodicity, and wherein the second configuration indicates a second monitoring periodicity different from the first monitoring periodicity, and wherein the code for causing the UE to determine the number of BDs comprises code for causing the UE to determine the number of BDs based on at least one of the first monitoring periodicity, the first SCS, the second monitoring periodicity, or the first SCS.

31. A non-transitory computer-readable medium having program code recorded thereon, the program code comprising:
code for causing a base station (BS) to transmit, to a user equipment (UE), a first configuration for scheduling in a first cell, wherein the first configuration is associated with a first search space in the first cell, and wherein the first cell is associated with a first subcarrier spacing (SCS);
code for causing the BS to transmit, to the UE, a second configuration for scheduling in the first cell, wherein the second configuration is associated with a second search space in a second cell different from the first cell, and wherein the second cell is associated with a second SCS different from the first SCS;
code for causing the BS to transmit, to the UE, a third configuration indicating a third SCS associated with a number of downlink control information (DCI) blind detections (BDs) in the first search space and the second search space, wherein the third SCS corresponds to one of the first SCS or the second SCS; and
code for causing the BS to transmit, to the UE, DCI in at least one of the first search space or the second search space based on the number of DCI BDs.

32. The non-transitory computer-readable medium of claim 31, wherein the program code further comprises:
code for causing the BS to determine the number of DCI BDs based on the third SCS and a capability of the UE.

33. The non-transitory computer-readable medium of any of claim 31 or 32, wherein the code for causing the BS to transmit the third configuration indicating the third SCS comprises code for causing the BS to transmit, to the UE, a radio resource control (RRC) configuration comprising the third configuration.

34. A user equipment (UE), comprising:
means for receiving, from a base station (BS), a first configuration for scheduling in a first cell, wherein the first configuration is associated with a first search space in the first cell, and wherein the first cell is associated with a first subcarrier spacing (SCS);
means for receiving, from the BS, a second configuration for scheduling in the first cell, wherein the second configuration is associated with a second search space in a second cell different from the first cell, and wherein the second cell is associated with a second SCS different from the first SCS;

means for determining a number of blind detections (BDs) based on at least one of the first SCS or the second SCS; and means for monitoring, based on the number of BDs, for downlink control information (DCI) in the first search space and the second search space.

35. The UE of claim 34, wherein the means for determining the number of BDs comprises:

means for selecting a lower SCS between the first SCS or the second SCS; and means for determining the number of BDs based on a configuration associated with the lower SCS.

36. The UE of claim 34, wherein the means for determining the number of BDs comprises:

means for selecting a higher SCS between the first SCS or the second SCS; and means for determining the number of BDs based on a configuration associated with the higher SCS.

37. The UE of claim 34, further comprising:

means for receiving, from the BS, a radio resource control (RRC) configuration indicating a third SCS, wherein the third SCS corresponds to the first SCS or the second SCS, wherein the means for determining the number of BDs comprises means for determining the number of BDs based on the third SCS.

38. The UE of any of claims 34-37, wherein the means for monitoring for the DCI comprises:

means for performing a first subset of the BDs in the first search space; and means for performing a second subset of the BDs in the second search space.

39. The UE of any of claims 34-38, wherein the means for monitoring for the DCI comprises:

means for determining whether a total number of DCI candidates in the first search space and the second search space exceeds the number of BDs; and means for excluding, in response to determining that the total number of DCI candidates exceed the number of BDs, the first search space or the second search space from the monitoring based on search space identifiers associated with the first search space and the second search space.

40. The UE of claim 39, wherein the at least one of the first search space comprises a first plurality of search spaces or the second search space comprises a second plurality of search spaces, and wherein the means for monitoring for the DCI comprises:

means for determining a total number of DCI candidates in the at least one of the first plurality of search spaces or the second plurality of search spaces exceeds the number of BDs;

means for excluding, in response to determining the total number of DCI candidates exceed the number of BDs, one or more search spaces from the at least one of the first plurality of search spaces or the second plurality of search spaces based on cell identifiers associated with the one or more search spaces; and means for excluding one or more other search spaces from the at least one of the first plurality of search spaces or the second plurality of search spaces further based on search space identifiers associated with the one or more other search spaces.

41. The UE of any of claims 34-40, wherein the first configuration indicates a first monitoring periodicity, and wherein the second configuration indicates a second monitoring periodicity different from the first monitoring periodicity, and wherein the means for determining the number of BDs comprises means for determining the number of BDs based on at least one of the first monitoring periodicity, the first SCS, the second monitoring periodicity, or the first SCS.

42. A base station (BS), comprising:

means for transmitting, to a user equipment (UE), a first configuration for scheduling in a first cell, wherein the first configuration is associated with a first search space in the first cell, and wherein the first cell is associated with a first subcarrier spacing (SCS);

means for transmitting, to the UE, a second configuration for scheduling in the first cell, wherein the second configuration is associated with a second search space in a second cell different from the first cell, and wherein the second cell is associated with a second SCS different from the first SCS;

means for transmitting, to the UE, a third configuration indicating a third SCS associated with a number of downlink control information (DCI) blind detections (BDs) in the first search space and the second search space, wherein the third SCS corresponds to one of the first SCS or the second SCS; and means for transmitting, to the UE, DCI in at least one of the first search space or the second search space based on the number of DCI BDs.

43. The BS of claim 42, further comprising:

means for determining the number of DCI BDs based on the third SCS and a capability of the UE.

44. The BS of any of claim 42 or 43, wherein the means for transmitting the third configuration indicating the third SCS comprises means for transmitting, to the UE, a radio resource control (RRC) configuration comprising the third configuration.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving a first configuration for scheduling in a first cell, wherein the first configuration is associated with a first search space in the first cell, and wherein the first cell is associated with a first subcarrier spacing (SCS) configuration;
   receiving a second configuration for scheduling in the first cell, wherein the second configuration is associated with a second search space in a second cell different from the first cell, and wherein the second cell is associated with a second SCS configuration different from the first SCS configuration; and
   monitoring, based on a number of blind detection (BDs), for downlink control information (DCI) in the second search space, wherein the number of BDs is based on at least one of the first SCS configuration or the second SCS configuration, and wherein the monitoring comprises:
      allocating the second search space, and not the first search space, for the monitoring, wherein the allocating is in response to a determination that a total number of DCI candidates in the first search space and the second search space exceeds the number of BDs, and wherein the allocating is based on a search space identifier associated with the second search space.

2. The method of claim 1, wherein the number of BDs is based on a selection of the first SCS configuration or the second SCS configuration based on a lower SCS between the first SCS configuration or the second SCS configuration.

3. The method of claim 1, wherein the number of BDs is based on a selection of the first SCS configuration or the second SCS configuration based on a higher SCS between the first SCS configuration or the second SCS configuration.

4. The method of claim 1, further comprising:
   receiving a radio resource control (RRC) configuration indicating a third SCS configuration, wherein the third SCS configuration corresponds to the first SCS configuration or the second SCS configuration,
   wherein the number of BDs is further based on the third SCS configuration.

5. The method of claim 1, wherein the monitoring for the DCI comprises:
   performing a subset of the BDs in the second search space.

6. The method of claim 1, wherein the at least one of the first search space comprises a first plurality of search spaces or the second search space comprises a second plurality of search spaces, and wherein the monitoring for the DCI comprises:
   determining a total number of DCI candidates in the at least one of the first plurality of search spaces or the second plurality of search spaces exceeds the number of BDs;
   excluding, in response to determining the total number of DCI candidates exceed the number of BDs, one or more search spaces from the at least one of the first plurality of search spaces or the second plurality of search spaces based on cell identifiers associated with the one or more search spaces; and
   excluding one or more other search spaces from the at least one of the first plurality of search spaces or the second plurality of search spaces further based on search space identifiers associated with the one or more other search spaces.

7. The method of claim 1, wherein the first configuration indicates a first monitoring periodicity, and wherein the second configuration indicates a second monitoring periodicity different from the first monitoring periodicity, and wherein the number of BDs is further based on at least one of the first monitoring periodicity, the first SCS configuration, the second monitoring periodicity, or the second SCS configuration.

8. The method of claim 1, wherein:
   the first cell is a primary cell (Pcell) and the second cell is a secondary cell (Scell);
   the first SCS configuration is less than the second SCS configuration;
   the number of BDs is based on the first SCS configuration.

9. A user equipment (UE), comprising:
   a processor; and
   a transceiver in communication with the processor, wherein the UE is configured to:
      receive a first configuration for scheduling in a first cell, wherein the first configuration is associated with a first search space in the first cell, and wherein the first cell is associated with a first subcarrier spacing (SCS) configuration; and
      receive a second configuration for scheduling in the first cell, wherein the second configuration is associated with a second search space in a second cell different from the first cell, and wherein the second cell is associated with a second SCS configuration different from the first SCS configuration; and
   monitor, based on a number of blind detections (BDs), for downlink control information (DCI) in the second search space, wherein the number of BDs is based on at least one of the first SCS configuration or the second SCS configuration, and wherein the monitoring comprises:
      allocate the second search space, and not the first search space, to monitor for the DCI, wherein the UE is configured to allocate the second search space:
         in response to a determination that a total number of DCI candidates in the first search space and the second search space exceeds the number of BDs, and based on a search space identifier associated with the second search space.

10. The UE of claim 9, wherein the processor is configured to:
  select one of the first SCS configuration or the second SCS configuration based on a lower SCS of the first SCS configuration or the second SCS configuration; and
  determine the number of BDs based on a configuration associated with the lower SCS.

11. The UE of claim 9, wherein the processor is configured to:
  select one of the first SCS configuration or the second SCS configuration based on a higher SCS of the first SCS configuration or the second SCS configuration; and
  determine the number of BDs based on a configuration associated with the higher SCS.

12. The UE of claim 9, wherein the transceiver is further configured to:
  receive a radio resource control (RRC) configuration indicating a third SCS configuration, wherein the third SCS configuration corresponds to the first SCS configuration or the second SCS configuration,
  wherein the processor is configured to determine the number of BDs based on the third SCS configuration.

13. The UE of claim 9, wherein the processor configured to monitor for the DCI comprises the processor configured to:
  perform a subset of the BDs in the second search space.

14. The UE of claim 9, wherein the at least one of the first search space comprises a first plurality of search spaces or the second search space comprises a second plurality of search spaces, and wherein the processor configured to monitor for the DCI comprises the processor configured to:
  determine a total number of DCI candidates in the at least one of the first plurality of search spaces or the second plurality of search spaces exceeds the number of BDs;
  exclude, in response to determining the total number of DCI candidates exceed the number of BDs, one or more search spaces from the at least one of the first plurality of search spaces or the second plurality of search spaces based on cell identifiers associated with the one or more search spaces; and
  exclude one or more other search spaces from the at least one of the first plurality of search spaces or the second plurality of search spaces further based on search space identifiers associated with the one or more other search spaces.

15. The UE of claim 9, wherein the first configuration indicates a first monitoring periodicity, and wherein the second configuration indicates a second monitoring periodicity different from the first monitoring periodicity, and wherein the processor is configured to determine the number of BDs based on at least one of the first monitoring periodicity, the first SCS configuration, the second monitoring periodicity, or the second SCS configuration.

16. The UE of claim 9, wherein:
  the first cell is a primary cell (Pcell) and the second cell is a secondary cell (Scell);
  the first SCS configuration is less than the second SCS configuration;
  the UE is configured to determine the number of BDs is based on the first SCS configuration.

17. A non-transitory, computer-readable medium having program code recorded thereon, wherein the program code comprises instructions executable by a processor of a user equipment (UE) to cause the UE to:
  receive a first configuration for scheduling in a first cell, wherein the first configuration is associated with a first search space in the first cell, and wherein the first cell is associated with a first subcarrier spacing (SCS) configuration; and
  receive a second configuration for scheduling in the first cell, wherein the second configuration is associated with a second search space in a second cell different from the first cell, and wherein the second cell is associated with a second SCS configuration different from the first SCS configuration; and
  monitor, based on a number of blind detections (BDs), for downlink control information (DCI) in the second search space, wherein the number of BDs is based on at least one of the first SCS configuration or the second SCS configuration, and wherein the instructions causing the UE to monitor comprise instructions causing the UE to:
    allocate the second search space, and not the first search space, to monitor for the DCI, wherein the instructions causing the UE to allocate the second search space cause the UE to allocate the second search space:
    in response to a determination that a total number of DCI candidates in the first search space and the second search space exceeds the number of BDs, and based on a search space identifier associated with the second search space.

18. The non-transitory, computer-readable medium of claim 17, wherein the program code further comprises instructions causing the UE to:
  select one of the first SCS configuration or the second SCS configuration based on a lower SCS of the first SCS configuration or the second SCS configuration; and
  determine the number of BDs based on a configuration associated with the lower SCS.

19. The non-transitory, computer-readable medium of claim 17, wherein the program code further comprises instructions causing the UE to:
  select one of the first SCS configuration or the second SCS configuration based on a higher SCS of the first SCS configuration or the second SCS configuration; and
  determine the number of BDs based on a configuration associated with the higher SCS.

20. The non-transitory, computer-readable medium of claim 17, wherein the program code further comprises instructions causing the UE to:
  receive a radio resource control (RRC) configuration indicating a third SCS configuration, wherein the third SCS configuration corresponds to the first SCS configuration or the second SCS configuration, and
  determine the number of BDs based on the third SCS configuration.

21. The non-transitory, computer-readable medium of claim 17, wherein the instructions causing the UE to monitor for the DCI comprises instructions causing the UE to:
  perform a subset of the BDs in the second search space.

22. The non-transitory, computer-readable medium of claim 17, wherein the at least one of the first search space comprises a first plurality of search spaces or the second search space comprises a second plurality of search spaces, and wherein the instructions causing the UE to monitor for the DCI comprises instructions causing the UE to:

determine a total number of DCI candidates in the at least one of the first plurality of search spaces or the second plurality of search spaces exceeds the number of BDs;

exclude, in response to determining the total number of DCI candidates exceed the number of BDs, one or more search spaces from the at least one of the first plurality of search spaces or the second plurality of search spaces based on cell identifiers associated with the one or more search spaces; and exclude one or more other search spaces from the at least one of the first plurality of search spaces or the second plurality of search spaces further based on search space identifiers associated with the one or more other search spaces.

23. The non-transitory, computer-readable medium of claim 17, wherein the first configuration indicates a first monitoring periodicity, and wherein the second configuration indicates a second monitoring periodicity different from the first monitoring periodicity, and wherein the program code further comprises instructions causing the UE to determine the number of BDs based on at least one of the first monitoring periodicity, the first SCS configuration, the second monitoring periodicity, or the second SCS configuration.

24. The non-transitory, computer-readable medium of claim 17, wherein:
the first cell is a primary cell (Pcell) and the second cell is a secondary cell (Scell);
the first SCS configuration is less than the second SCS configuration;
the program code further comprises instructions causing the UE to determine the number of BDs based on the first SCS configuration.

25. A user equipment (UE), comprising:
means for receiving a first configuration for scheduling in a first cell, wherein the first configuration is associated with a first search space in the first cell, and wherein the first cell is associated with a first subcarrier spacing (SCS) configuration;
means for receiving a second configuration for scheduling in the first cell, wherein the second configuration is associated with a second search space in a second cell different from the first cell, and wherein the second cell is associated with a second SCS configuration different from the first SCS configuration; and means for monitoring, based on a number of blind detections (BDs), for downlink control information (DCI) in the second search space, wherein the number of BDs is based on at least one of the first SCS configuration or the second SCS configuration, and wherein the means for monitoring comprises:
means for allocating the second search space, and not the first search space, for the monitoring, wherein the allocating is in response to a determination that a total number of DCI candidates in the first search space and the second search space exceeds the number of BDs, and wherein the means for allocating is based on a search space identifier associated with the second search space.

26. The UE of claim 25, wherein the number of BDs is based on a selection of the first SCS configuration or the second SCS configuration based on a lower SCS between the first SCS configuration or the second SCS configuration.

27. The UE of claim 25, wherein the number of BDs is based on a selection of the first SCS configuration or the second SCS configuration based on a higher SCS between the first SCS configuration or the second SCS configuration.

28. The UE of claim 25, further comprising:
means for receiving a radio resource control (RRC) configuration indicating a third SCS configuration, wherein the third SCS configuration corresponds to the first SCS configuration or the second SCS configuration,
wherein the number of BDs is further based on the third SCS configuration.

29. The UE of claim 25, wherein the first configuration indicates a first monitoring periodicity, and wherein the second configuration indicates a second monitoring periodicity different from the first monitoring periodicity, and wherein the number of BDs is further based on at least one of the first monitoring periodicity, the first SCS configuration, the second monitoring periodicity, or the second SCS configuration.

30. The UE of claim 25, wherein:
the first cell is a primary cell (Pcell) and the second cell is a secondary cell (Scell);
the first SCS configuration is less than the second SCS configuration;
the number of BDs is based on the first SCS configuration.

* * * * *